US010453249B2

(12) United States Patent
Smirnov et al.

(10) Patent No.: US 10,453,249 B2
(45) Date of Patent: Oct. 22, 2019

(54) METHOD FOR ALIGNMENT OF LOW-QUALITY NOISY DEPTH MAP TO THE HIGH-RESOLUTION COLOUR IMAGE

(71) Applicant: Nokia Technologies Oy, Espoo (FI)

(72) Inventors: Sergey Smirnov, Tampere (FI); Mihail Georgiev, Tampere (FI); Atanas Gotchev, Pirkkala (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 175 days.

(21) Appl. No.: 15/521,883

(22) PCT Filed: Oct. 23, 2015

(86) PCT No.: PCT/FI2015/050724
§ 371 (c)(1),
(2) Date: Apr. 25, 2017

(87) PCT Pub. No.: WO2016/066893
PCT Pub. Date: May 6, 2016

(65) Prior Publication Data
US 2017/0316602 A1    Nov. 2, 2017

(30) Foreign Application Priority Data
Oct. 31, 2014   (GB) .................................. 1419379.1

(51) Int. Cl.
*G06K 9/00*        (2006.01)
*G06T 15/20*       (2011.01)
(Continued)

(52) U.S. Cl.
CPC .......... *G06T 15/205* (2013.01); *G06T 3/0031* (2013.01); *G06T 3/0068* (2013.01);
(Continued)

(58) Field of Classification Search
None
See application file for complete search history.

(56) References Cited

U.S. PATENT DOCUMENTS

| 6,373,977 B1 | 4/2002 | Culbertson |
| 7,633,511 B2 | 12/2009 | Shum et al. |

(Continued)

FOREIGN PATENT DOCUMENTS

| WO | 2010/088032 A2 | 8/2010 |
| WO | 2014/044569 A1 | 3/2014 |
| WO | 2014/177750 A1 | 11/2014 |

OTHER PUBLICATIONS

International Search Report and Written Opinion received for corresponding Patent Cooperation Treaty Application No. PCT/FI2015/050724 dated Jan. 21, 2016 , 15 pages.

(Continued)

*Primary Examiner* — Stephen P Coleman
(74) *Attorney, Agent, or Firm* — Alston & Bird LLP

(57) ABSTRACT

Various embodiments are provided which relate to the field of image signal processing, specifically relating to the generation of a depth-view image of a scene from a set of input images of a scene taken at different cameras of a multi-view imaging system. A method comprises obtaining a frame of an image of a scene and a frame of a depth map regarding the frame of the image. A minimum depth and a maximum depth of the scene and a number of depth layers for the depth map are determined. Pixels of the image are projected to the depth layers to obtain projected pixels on the depth layers; and cost values for the projected pixels are determined. The cost values are filtered and a filtered cost value is selected from a layer to obtain a depth value of a pixel of an estimated depth map.

21 Claims, 20 Drawing Sheets

(51) Int. Cl.
| | |
|---|---|
| G06T 3/00 | (2006.01) |
| G06T 3/40 | (2006.01) |
| G06T 5/00 | (2006.01) |
| G06T 7/536 | (2017.01) |
| G06T 7/521 | (2017.01) |
| G06T 7/77 | (2017.01) |
| G06T 7/557 | (2017.01) |
| G06T 7/593 | (2017.01) |
| H04N 13/189 | (2018.01) |
| H04N 13/282 | (2018.01) |
| G06T 5/50 | (2006.01) |
| H04N 13/111 | (2018.01) |
| H04N 13/271 | (2018.01) |
| H04N 13/128 | (2018.01) |

(52) U.S. Cl.
CPC ............ *G06T 3/4007* (2013.01); *G06T 5/001* (2013.01); *G06T 5/004* (2013.01); *G06T 5/50* (2013.01); *G06T 7/521* (2017.01); *G06T 7/536* (2017.01); *G06T 7/557* (2017.01); *G06T 7/593* (2017.01); *G06T 7/77* (2017.01); *H04N 13/111* (2018.05); *H04N 13/128* (2018.05); *H04N 13/189* (2018.05); *H04N 13/271* (2018.05); *H04N 13/282* (2018.05); *G06T 2207/10024* (2013.01); *G06T 2207/10028* (2013.01); *G06T 2207/10052* (2013.01); *G06T 2207/20024* (2013.01); *G06T 2207/20221* (2013.01); *G06T 2207/30244* (2013.01); *G06T 2215/16* (2013.01); *H04N 2213/003* (2013.01)

(56) References Cited

U.S. PATENT DOCUMENTS

| | | |
|---|---|---|
| 2011/0267348 A1 | 11/2011 | Lin et al. |
| 2011/0285813 A1 | 11/2011 | Girdzijauskas et al. |
| 2013/0129224 A1 | 5/2013 | Katz et al. |
| 2013/0294710 A1 | 11/2013 | Chou et al. |
| 2014/0146139 A1 | 5/2014 | Schwartz et al. |
| 2014/0160123 A1 | 6/2014 | Yang et al. |
| 2014/0267616 A1 | 9/2014 | Krig |

OTHER PUBLICATIONS

Cho, J.-H. et al.: "Depth map up-sampling using cost volume filtering", IEEE Image, Video and Multidimensional Signal Processing Workshop,Jun. 10-12, 2013, Seoul, South Korea, 4 pages.
Chuchvara, A. et al.: "CPU-efficient free view synthesis based on depth layering", 3DTV Conference, Jul. 2-4, 2014, Budapest, Hungary, 4 pages. section 2, section 3.1, section 3.2; Fig. 3.
Smirnov, S. et al.: "Methods for depth-map filtering in view-plus-depth 3D video representation", EURASIP Journal on Advances in Signal Processing 2012, 2012:25, 21 pages. section 2.1, section 2.2, section 3.2, section 3.3; Fig. 8.
Yang, Q. et al.: "Spatial-depth super resolution for range images", IEEE Conf. on Computer Vision and Pattern Recognition, Jun. 17-22, 2007, Minneapolis, USA, 8 pages.
Li, L. et al.: "A nonlocal filter-based hybrid strategy for depth map enhancement", Int. Conf. on Pattern Recognition, Aug. 24-28, 2014, Stockholm, Sweden, pp. 4394-4399.
Bartczak, B. et al.: "Dense depth maps from low resolution time-of-flight depth and high resolution color views", Advances in Visual Computing, vol. 5876, 2009, pp. 228-239.
Geys et al., "Fast Interpolated Cameras by Combining a GPU Based Plane Sweep With a Max-Flow Regularisation Algorithm", Proceedings. 2nd International Symposium on 3D Data Processing, Visualization and Transmission (3DPVT'04), Sep. 9, 2004, 8 pages.
Gallup et al., "Real-Time Plane-Sweeping Stereo with Multiple Sweeping Directions", IEEE Conference on Computer Vision and Pattern Recognition, Jun. 17-22, 2007, 8 pages.
Goorts et al., "Free Viewpoint Video for Soccer Using Histogram-Based Validity Maps in Plane Sweeping", International Conference on Computer Vision Theory and Applications (VISAPP), Jan. 5-8, 2014, 9 pages.
Goorts et al., "Optimization of Free Viewpoint Interpolation by Applying Adaptive Depth Plane Distributions in Plane Sweeping a Histogram-based Approach to a Non-uniform Plane Distribution", International Conference on Signal Processing and Multimedia Applications (SIGMAP), Jul. 29-31, 2013, 9 pages.
Takahashi et al., "Super-Resolved Free-Viewpoint Image Synthesis Based on View-Dependent Depth Estimation", IPSJ Transactions on Computer Vision and Applications, vol. 4, Oct. 2012, pp. 134-148.
Evers-Senne et al., "Visual Reconstruction using Geometry Guided Photo Consistency", Vision, Modeling, and Visualization 2006: Proceedings, Nov. 22-24, 2006, 9 pages.
Goorts et al., "D4.5 Smooth View Interpolation Algorithms", Free-viewpoint Immersive Networked Experience (FINE), Aug. 2012, pp. 1-23.
Huhle et al., "Fusion of Range and Color Images for Denoising and Resolution Enhancement With a Non-local Filter", Computer Vision and Image Understanding, vol. 114, No. 12, Dec. 2010, pp. 1336-1345.
Georgiev et al., "Joint de-noising and Fusion of 2D Video and Depth Map Sequences Sensed by Low-Powered TOF Range Sensor", IEEE International Conference on Multimedia and Expo Workshops (ICMEW), Jul. 15-19, 2013, 5 pages.
Kopf et al., "Joint Bilateral Upsampling", ACM Transactions on Graphics (TOG), vol. 26, No. 3, Article No. 96, Jul. 2007, pp. 96-1-96-5.
Yang et al., "Fusion of Median and Bilateral Filtering for Range Image Upsampling", IEEE Transactions on Image Processing, vol. 22, No. 12, Dec. 2013, 12 pages.
Yang et al., "Fusion of Active and Passive Sensors for Fast 3D Capture", IEEE International Workshop on Multimedia Signal Processing (MMSP), Oct. 4-6, 2010, 6 pages.
Paris et al., "A Fast Approximation of the Bilateral Filter Using a Signal Processing Approach", International Journal of Computer Vision, vol. 81, No. 1, Jan. 2009, pp. 24-52.
Yang, "Recursive Bilateral Filtering", European Conference on Computer Vision (ECCV), 2012, 15 pages.
Sankaran et al., "Non-Uniform to Uniform Image Resampling Utilizing a 2D Farrow Structure", Proceedings of the International TICSP Workshop on Spectral Methods and Multirate Signal Processing, (SMMSP), 2007, 8 pages.
Hartley, "Multiple-View Geometry in Computer Vision", Cambridge University Press, 2003, 673 pages.
"Kinect v2 for Windows" Microsoft, Retrieved on Jun. 1, 2018, Webpage available at: https://developer.microsoft.com/en-us/windows/kinect.
"PMD[Vision] CamCube 2.0 Time of Flight Camera" Youtube, Retrieved on Jun. 1, 2018, Webpage available at : https://www.youtube.com/watch?v=M34XiXYZihg.
Lindner et al., "Data-Fusion of PMD-Based Distance-Information and High-Resolution RGB-Images", International Symposium on Signals, Circuits and Systems, Jul. 13-14, 2007, 4 pages.
Lange et al., "Solid-State Time-of-Flight Range Camera", IEEE Journal of Quantum Electronics, vol. 37, No. 3, Mar. 2001, pp. 390-397.
Spirig et al., "The Lock-in CCD-two-Dimensional Synchronous Detection of Light", IEEE Journal of Quantum Electronics, vol. 31, No. 9, Sep. 1995, pp. 1705-1708.
Frank et al., "Theoretical and Experimental Error Analysis of Continuous-Wave Time-Of-Flight Range Cameras", Journal of Optical Engineering, vol. 48, No. 1, Jan. 1, 2009, pp. 1-25.
Chan et al., "A Noise-Aware Filter for Real-Time Depth Upsampling", Workshop on Multi-camera and Multi-modal Sensor Fusion Algorithms and Applications-M2SFA2, 2008, pp. 1-12.
"Camera Calibration Toolbox for Matlab" Computational Vision at Caltech, Retrieved on Jun. 1, 2018, Webpage available at : http://www.vision.caltech.edu/bouguetj/calib_doc/.

(56) References Cited

OTHER PUBLICATIONS

Hildebrand et al., "Resolution Enhancement by Time-Multiplexed Acquisition of Sub-Pixel Shifted Images Employing a Spatial Light Modulator", International Symposium on Optomechatronic Technologies (ISOT), Oct. 25-27, 2010, 6 pages.

Chuchvara et al., "A Speed-Optimized RGB-Z Capture System With Improved Denoising Capabilities", In Proceedings of Image Processing: Algorithms and Systems XII, vol. 9019, Mar. 2014, 13 pages.

Lindner et al., "Lateral and Depth Calibration of PMD-Distance Sensors", Proceedings of International Symposium on Visual Computing (ISVC), vol. 2, 2006, pp. 1-10.

Frank et al., "Denoising of Continuous-Wave Time-of-Flight Depth Images Using Confidence Measures", Journal of Optical Engineering(OE), vol. 48, No. 7, 2009, pp. 1-24.

Georgiev et al., "De-Noising of Distance Maps Sensed by Time-of-Flight Devices in Poor Sensing Environment", IEEE International Conference on Acoustics, Speech and Signal Processing (ICASSP), May 26-31, 2013, 6 pages.

Georgiev et al., "Real-Time Denoising of ToF Measurements by Spatio-Temporal Non-Local Mean Filtering", IEEE International Conference on Multimedia and Expo Workshops (ICMEW), Jul. 15-19, 2013, 7 pages.

Collins, "A Space-Sweep Approach to True Multi-Image Matching", IEEE Computer Society Conference on Computer Vision and Pattern Recognition, Jun. 18-20, 1996, 9 pages.

Szeliski, "Plane Sweep (Computer Vision: Algorithms and Applications)", Computer Vision: Algorithms and Applications, 2010, 4 pages.

Scharstein et al., "A Taxonomy and Evaluation of Dense Two-Frame Stereo Correspondence Algorithms", International Journal of Computer Vision, vol. 47, No. 1-3, Apr. 2002, pp. 7-42.

Buades et al., "A Non-Local Algorithm for Image Denoising", IEEE Computer Society Conference on Computer Vision and Pattern Recognition (CVPR), vol. 2, Jun. 20-25, 2005, 6 pages.

Dabov et al., "BM3D Image Denoising with Shape-Adaptive Principal Component Analysis", Signal Processing with Adaptive Sparse Structured Representations (SPARS), 2009, 6 pages.

Tomasi et al., "Bilateral Filtering for Gray and Color Images", Sixth International Conference on Computer Vision, Jan. 7, 1998, 8 pages.

Pearson et al., "Plenoptic Layer-Based Modeling for Image Based Rendering", IEEE Transactions on Image Processing, vol. 22, No. 9, Sep. 2013, pp. 3405-3419.

Wang et al., "Layered Textures for Image-Based Rendering", Journal of Computer Science and Technology, vol. 19, No. 5, Sep. 2004, pp. 633-642.

Kolb et al., "Time-of-Flight Cameras in Computer Graphics", Computer Graphics Forum, vol. 29, No. 1, 2010, pp. 1-18.

Shen et al., "Layer Depth Denoising and Completion for Structured-Light RGB-D Cameras", IEEE Conference on Computer Vision and Pattern Recognition (CVPR), Jun. 23-28, 2013, pp. 1187-1194.

Park et al., "High Quality Depth Map Upsampling for 3D-TOF Cameras", IEEE International Conference on Computer Vision (ICCV), Nov. 6-13, 2011, 8 pages.

Tallon et al., "Upsampling and Denoising of Depth Maps via Joint-segmentation", Proceedings of the 20th European Signal Processing Conference (EUSIPCO), Aug. 27-31, 2012, pp. 245-249.

Schuon et al., "LidarBoost: Depth Superresolution for ToF 3D Shape Scanning", IEEE Conference on Computer Vision and Pattern Recognition, Jun. 20-25, 2009, 8 pages.

"D5.8 Depth Enhanced Inpainting Model and Automatic Detection of Occluded/Disoccluded Regions", 2020 3D Media Spatial Sound and Vision, 2010, pp. 1-27.

Nair et al., "A Survey on Time-of-Flight Stereo Fusion", Time-of-Flight and Depth Imaging. Sensors, Algorithms, and Applications, Sep. 11, 2013, pp. 1-21.

Schwarz et al., "Time-of-Flight Sensor Fusion with Depth Measurement Reliability Weighting", Transmission and Display of 3D Video (3DTV-CON) 3DTV-Conference: The True Vision—Capture, Jul. 2-4, 2014, 4 pages.

Colaco et al., "3dim: Compact and Low Power Time-of-flight Sensor for 3d Capture Using Parametric Signal Processing", Proceedings in Int. Image Sensor Workshop, 2013, 4 pages.

Search Report received for corresponding United Kingdom Patent Application No. 1419379.1, dated May 6, 2015, 4 pages.

Extended European Search Report received for corresponding European Patent Application No. 15855684.5, dated May 28, 2018, 8 pages.

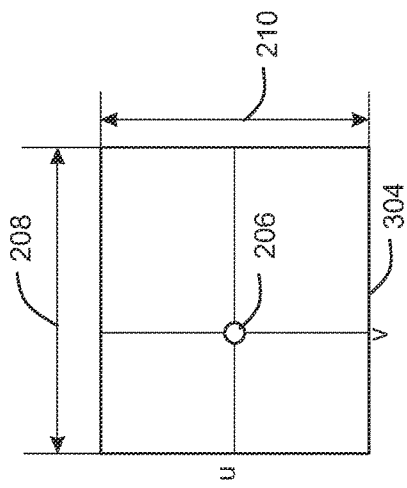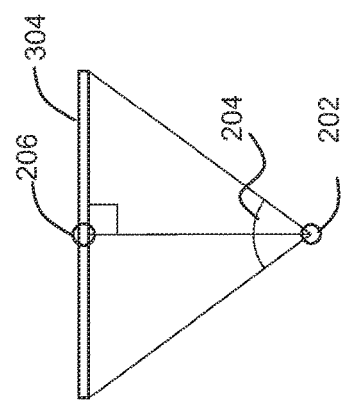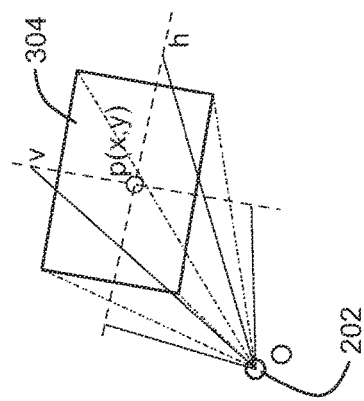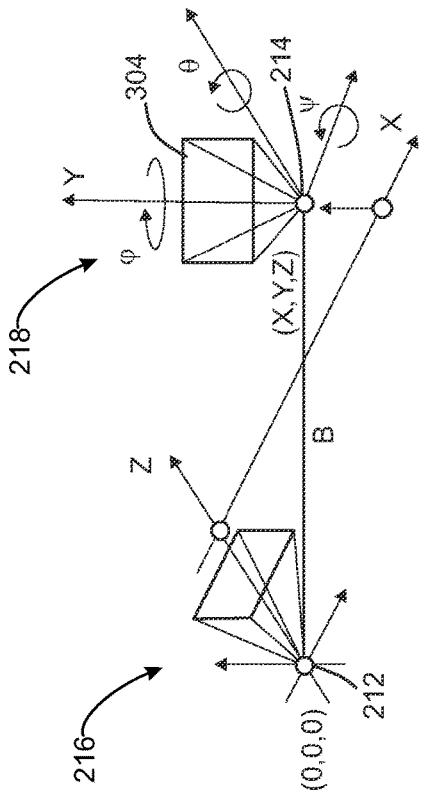
Fig. 2a
Fig. 2b

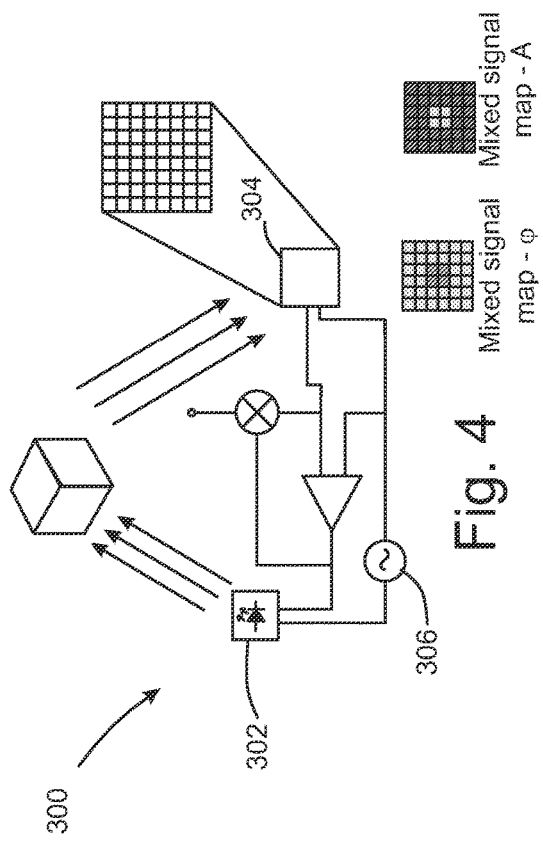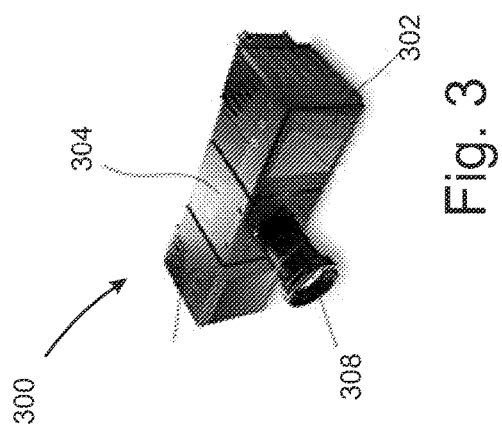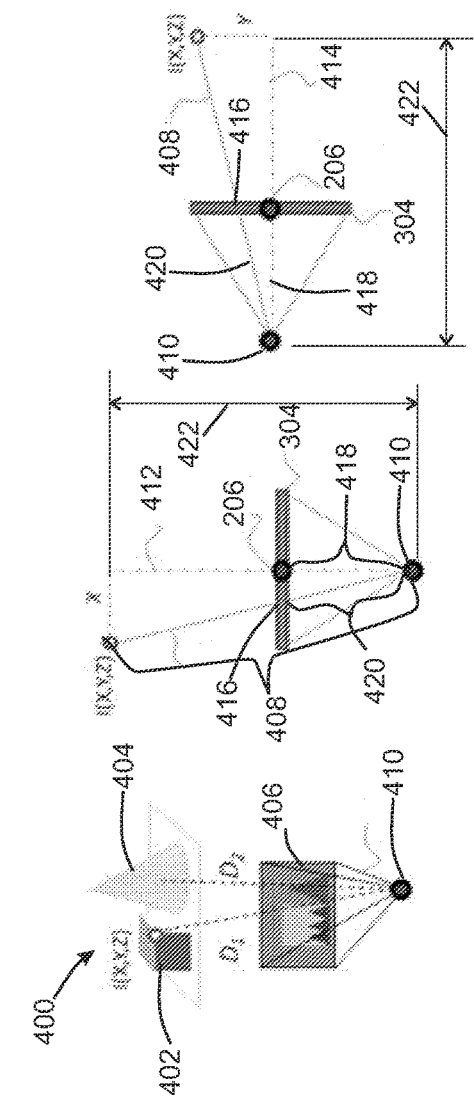

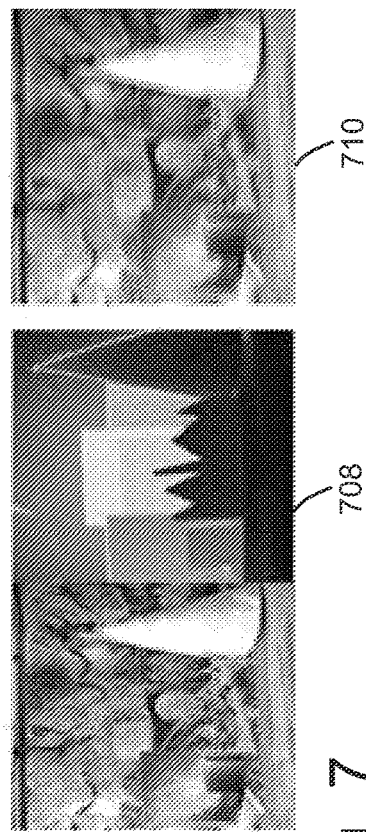
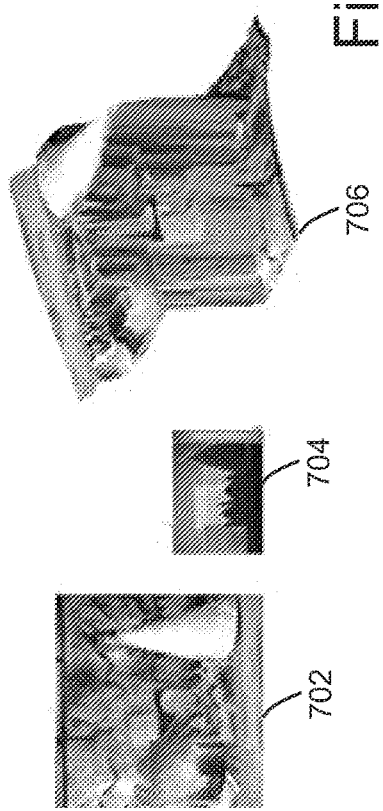
Fig. 7
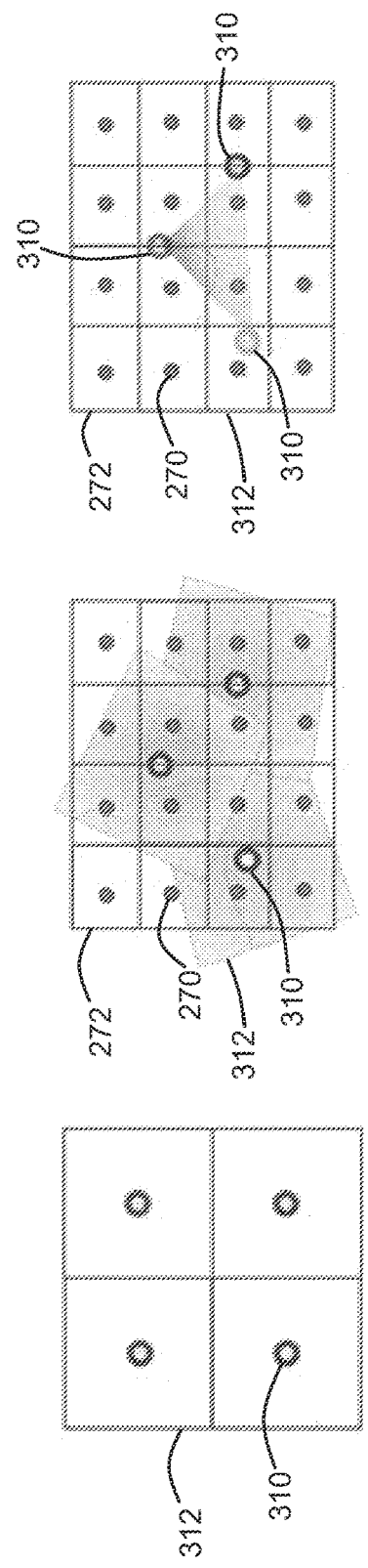
Fig. 8a
Fig. 8b
Fig. 8c

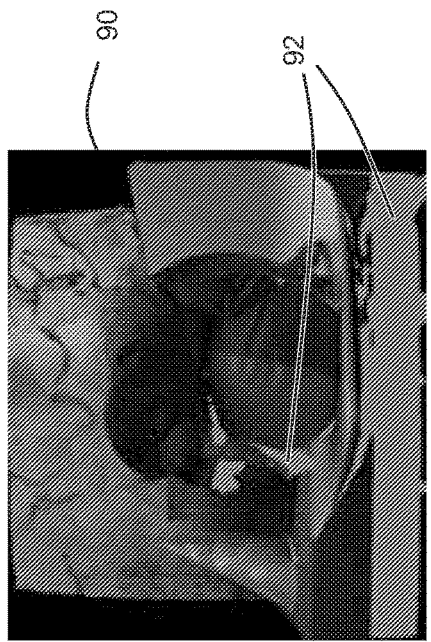
Fig. 9b
Fig. 9a
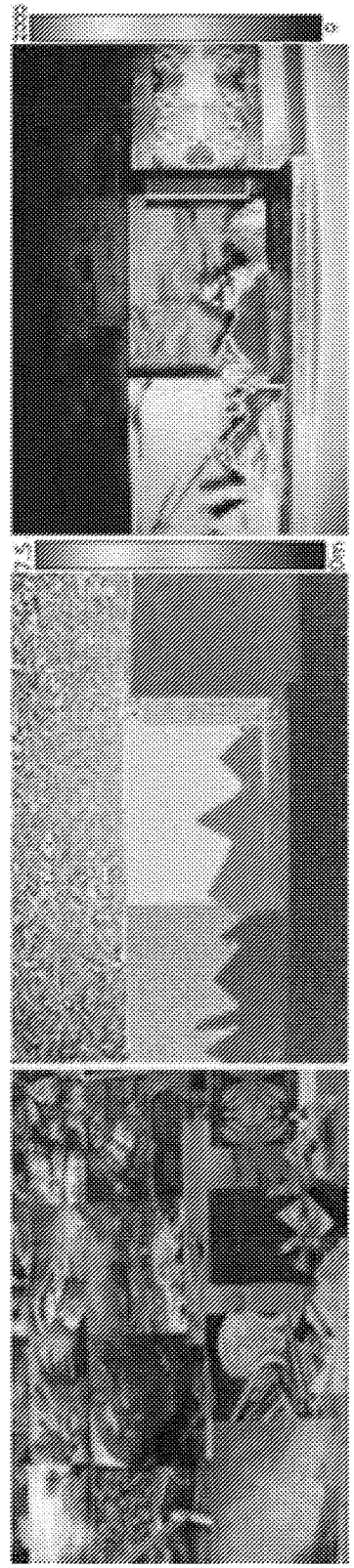
Fig. 10c
Fig. 10b
Fig. 10a

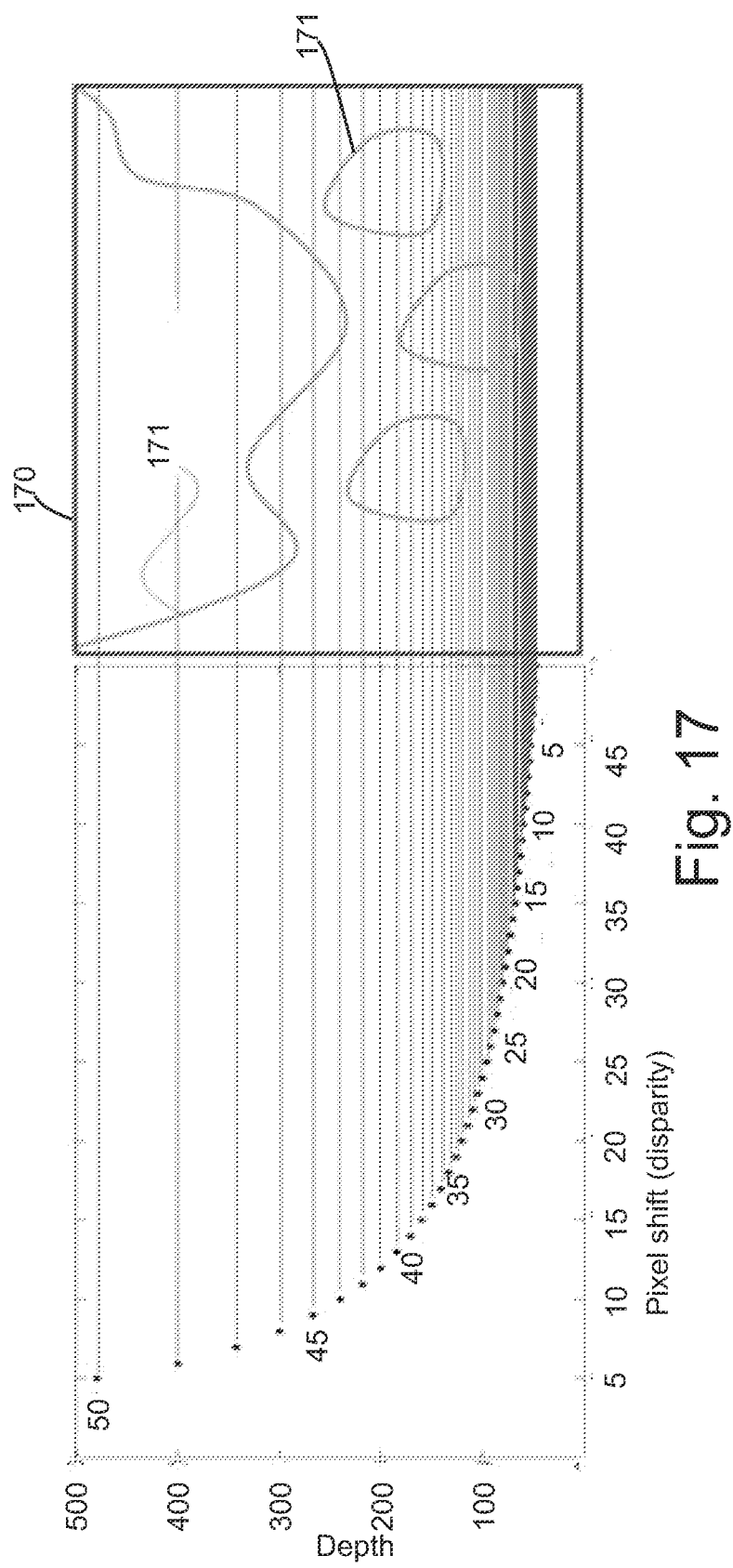

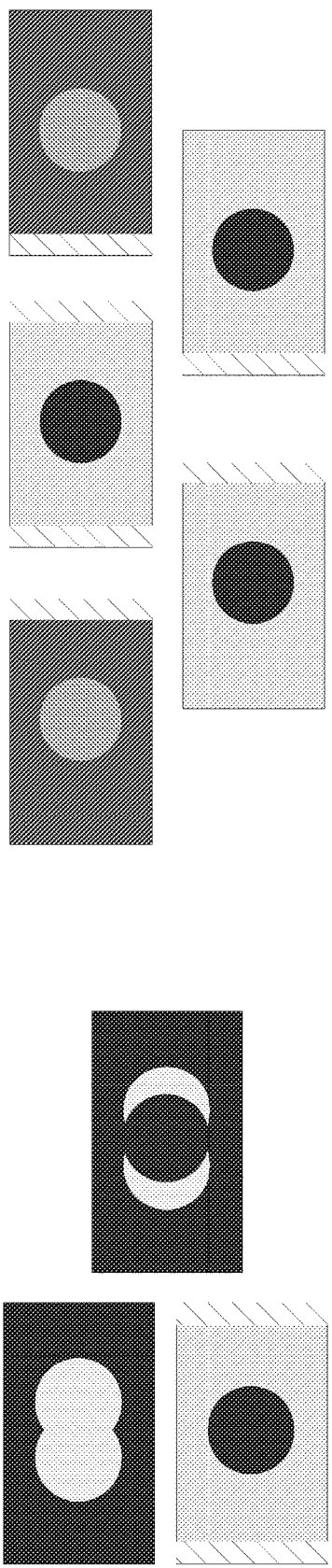
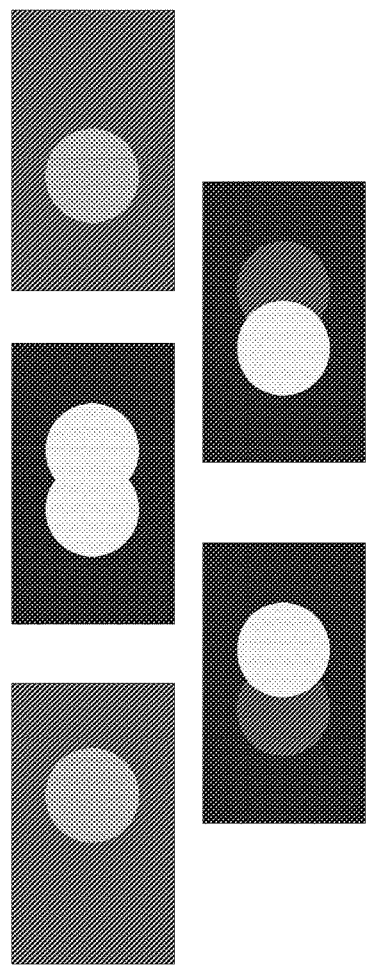
Fig. 28
Fig. 29
Fig. 30
Fig. 31

METHOD FOR ALIGNMENT OF LOW-QUALITY NOISY DEPTH MAP TO THE HIGH-RESOLUTION COLOUR IMAGE

RELATED APPLICATION

This application was originally filed as Patent Cooperation Treaty Application No. PCT/FI2015/050724 filed Oct. 23, 2015 which claims priority benefit to GB Patent Application No. 1419379.1, filed Oct. 31, 2014.

TECHNOLOGICAL FIELD

The various embodiments of the invention are related to the field of image signal processing, specifically relating to the generation of a depth-view image of a scene from a set of input images of a scene taken at different cameras of a multi-view imaging system.

BACKGROUND

Number of applications, such as three-dimensional (3D) and free-viewpoint TV, augmented reality, 3D visualization, 3D shape and colour scanning, simultaneous localization and mapping (SLAM), image segmentation and many others use view-plus-depth image format, which is also known as RGB+D format, as a main input source. In this format, each pixel of a digital colour image is augmented with the corresponding depth value, specifying distance between a corresponding point in the scene and the optical centre of the camera. Performance of these applications may directly depend on the quality of the supplied depth maps.

Many consumer-level 3D cameras may have two camera sensors, one of which is dedicated for the depth acquisition and another is for capturing a high-quality colour image. In order to construct a combined view-plus-depth frame, depth map may need to be aligned to the main (reference) colour view, and then up-sampled and denoised, if necessary. As the depth map itself can play a role of a mapping function, its alignment with the colour frame may be done through 3D image warping. Taking into account that colour and depth cameras are calibrated (their poses are known) such warping can be easily done in the per-pixel fashion. Some depth sensors, for instance such as time of flight (ToF)-based sensors, may have significantly lower original resolution than a reference colour camera, which may make depth up-sampling step obligatory.

Except lower resolution, depth sensors may also be prone to noise and other types of errors, including systematic errors. For time-of-flight cameras, those may especially be visible on the surfaces with low or non-Lambertian reflectance or on some materials, like hair. Another source of noise in the time-of-flight cameras is connected with the power of illumination. For instance, when using such camera in a mobile environment (e.g. as a handheld device), due to restricted power consumption infra-red emitters may not be able to illuminate with full power and hence, sensed reflectance may be worsen. Other active depth sensors, such as based on the triangulation, may have depth errors connected with too sparse correlation pattern, which may result in wrong shapes of object boundaries and over-smoothing of small details.

One problem appearing for many two-sensor 3D cameras is that it may not be possible to filter depth map using available colour image until it is aligned with a colour view and it is not possible to align a depth map before it was filtered.

Another problem, connected with the direct depth map projection is that a non-regular-to-regular grid resampling may be needed. Since projected depth values have non-regular positions on the colour camera sensor, their resampling to a regular pixel grid may be needed.

BRIEF SUMMARY

There is disclosed a method comprising
obtaining a frame of an image of a scene;
obtaining a frame of a depth map regarding the frame of the image;
determining a minimum depth and a maximum depth of the scene;
determining a number of depth layers for the depth map;
projecting pixels of the image to the depth layers to obtain projected pixels on the depth layers;
determining cost values for the projected pixels;
filtering the cost values; and
selecting a filtered cost value from a layer to obtain a depth value of a pixel of an estimated depth map.

In an alternative embodiment, an apparatus is provided that comprises at least a processor and an associated memory, said memory containing computer coded instructions which, when executed by a processor, cause the apparatus to
obtain a frame of an image of a scene;
obtain a frame of a depth map regarding the frame of the image;
determine a minimum depth and a maximum depth of the scene;
determine a number of depth layers for the depth map;
project pixels of the image to the depth layers to obtain projected pixels on the depth layers;
determine cost values for the projected pixels;
filter the cost values; and
select a filtered cost value from a layer to obtain a depth value of a pixel of an estimated depth map.

Another embodiment is a computer program product comprising computer instructions residing in a non-transitory computer-readable medium, the instructions when executed by a processor cause the apparatus to obtain a frame of an image of a scene;
obtain a frame of a depth map regarding the frame of the image;
determine a minimum depth and a maximum depth of the scene;
determine a number of depth layers for the depth map;
project pixels of the image to the depth layers to obtain projected pixels on the depth layers;
determine cost values for the projected pixels;
filter the cost values; and
select a filtered cost value from a layer to obtain a depth value of a pixel of an estimated depth map.

In an alternative embodiment, a method is provided that comprises obtaining a frame of a colour image of a scene;
obtaining a frame of a depth map regarding the frame of the image;
determining a number of depth layers;
estimating a projective transform of the colour image for a depth layer;
back-projecting the colour image by the estimated projective transform;
calculating a cost map for the projected colour image;
filtering the cost map; and
obtaining output data map by aggregating one or more filtered cost maps.

In an alternative embodiment, an apparatus is provided that comprises at least a processor and an associated memory, said memory containing computer coded instructions which, when executed by a processor, cause the apparatus to
- obtain a frame of an image of a scene;
- obtain a frame of a depth map regarding the frame of the image;
- determine a number of depth layers;
- estimate a projective transform of the colour image for a depth layer;
- back-project the colour image by the estimated projective transform;
- calculate a cost map for the projected colour image;
- filter the cost map; and
- obtain output data map by aggregating one or more filtered cost maps.

Another embodiment is a computer program product comprising computer instructions residing in a non-transitory computer-readable medium, the instructions when executed by a processor cause the apparatus to
- obtain a frame of an image of a scene;
- obtain a frame of a depth map regarding the frame of the image;
- determine a number of depth layers;
- estimate a projective transform of the colour image for a depth layer;
- back-project the colour image by the estimated projective transform;
- calculate a cost map for the projected colour image;
- filter the cost map; and
- obtain output data map by aggregating one or more filtered cost maps.

In an alternative embodiment, a method is provided that comprises
- obtaining a first frame of a first colour image of a scene from a first view point;
- obtaining a second frame of a second colour image of the scene from a second view point different from the first view point;
- obtaining information on a virtual camera position with respect to the first view point and the second view point;
- defining a number of hypothezises for the virtual camera position;
- projecting the first frame and the second frame to the view point of the virtual camera position for the hypothezises;
- determining a first cost volume for the first frame and a second cost volume for the second frame;
- filtering the cost volumes using colour weights of the projected frame;
- obtaining a virtual image corresponding to the virtual camera position on the basis of the filtered cost volumes and the projected frame.

In an alternative embodiment, an apparatus is provided that comprises at least a processor and an associated memory, said memory containing computer coded instructions which, when executed by a processor, cause the apparatus to
- obtain a first frame of a first colour image of a scene from a first view point;
- obtain a second frame of a second colour image of the scene from a second view point different from the first view point;
- obtain information on a virtual camera position with respect to the first view point and the second view point;
- define a number of hypothezises for the virtual camera position;
- project the first frame and the second frame to the view point of the virtual camera position for the hypothezises;
- determine a first cost volume for the first frame and a second cost volume for the second frame;
- filter the cost volumes using colour weights of the projected frame;
- obtain a virtual image corresponding to the virtual camera position on the basis of the filtered cost volumes and the projected frame.

Another embodiment is a computer program product comprising computer instructions residing in a non-transitory computer-readable medium, the instructions when executed by a processor cause the apparatus to
- obtain a first frame of a first colour image of a scene from a first view point;
- obtain a second frame of a second colour image of the scene from a second view point different from the first view point;
- obtain information on a virtual camera position with respect to the first view point and the second view point;
- define a number of hypothezises for the virtual camera position;
- project the first frame and the second frame to the view point of the virtual camera position for the hypothezises;
- determine a first cost volume for the first frame and a second cost volume for the second frame;
- filter the cost volumes using colour weights of the projected frame;
- obtain a virtual image corresponding to the virtual camera position on the basis of the filtered cost volumes and the projected frame.

In yet another embodiment, an apparatus is provided that comprises means for
- obtaining a frame of an image of a scene;
- obtaining a frame of a depth map regarding the frame of the image;
- determining a minimum depth and a maximum depth of the scene;
- determining a number of depth layers for the depth map;
- projecting pixels of the image to the depth layers to obtain projected pixels on the depth layers;
- determining cost values for the projected pixels;
- filtering the cost values; and
- selecting a filtered cost value from a layer to obtain a depth value of a pixel of an estimated depth map.

In yet another embodiment, an apparatus is provided that comprises means for obtaining a frame of a colour image of a scene;
- obtaining a frame of a depth map regarding the frame of the image;
- determining a number of depth layers;
- estimating a projective transform of the colour image for a depth layer;
- back-projecting the colour image by the estimated projective transform;
- calculating a cost map for the projected colour image;
- filtering the cost map; and
- obtaining output data map by aggregating one or more filtered cost maps.

In yet another embodiment, an apparatus is provided that comprises means for
obtaining a first frame of a first colour image of a scene from a first view point;
obtaining a second frame of a second colour image of the scene from a second view point different from the first view point;
obtaining information on a virtual camera position with respect to the first view point and the second view point;
defining a number of hypothezises for the virtual camera position;
projecting the first frame and the second frame to the view point of the virtual camera position for the hypothezises;
determining a first cost volume for the first frame and a second cost volume for the second frame;
filtering the cost volumes using colour weights of the projected frame;
obtaining a virtual image corresponding to the virtual camera position on the basis of the filtered cost volumes and the projected frame.

BRIEF DESCRIPTION OF THE SEVERAL VIEWS OF THE DRAWINGS

Figure 1:
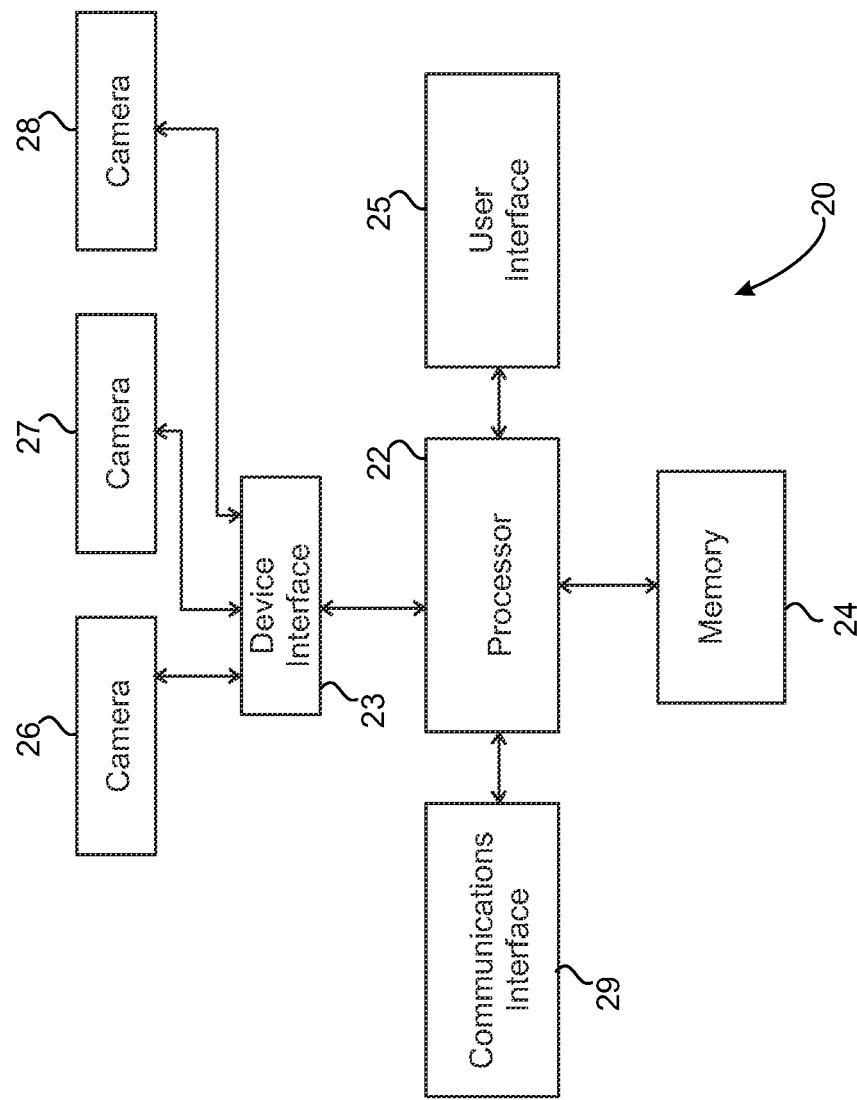
Figure 6:
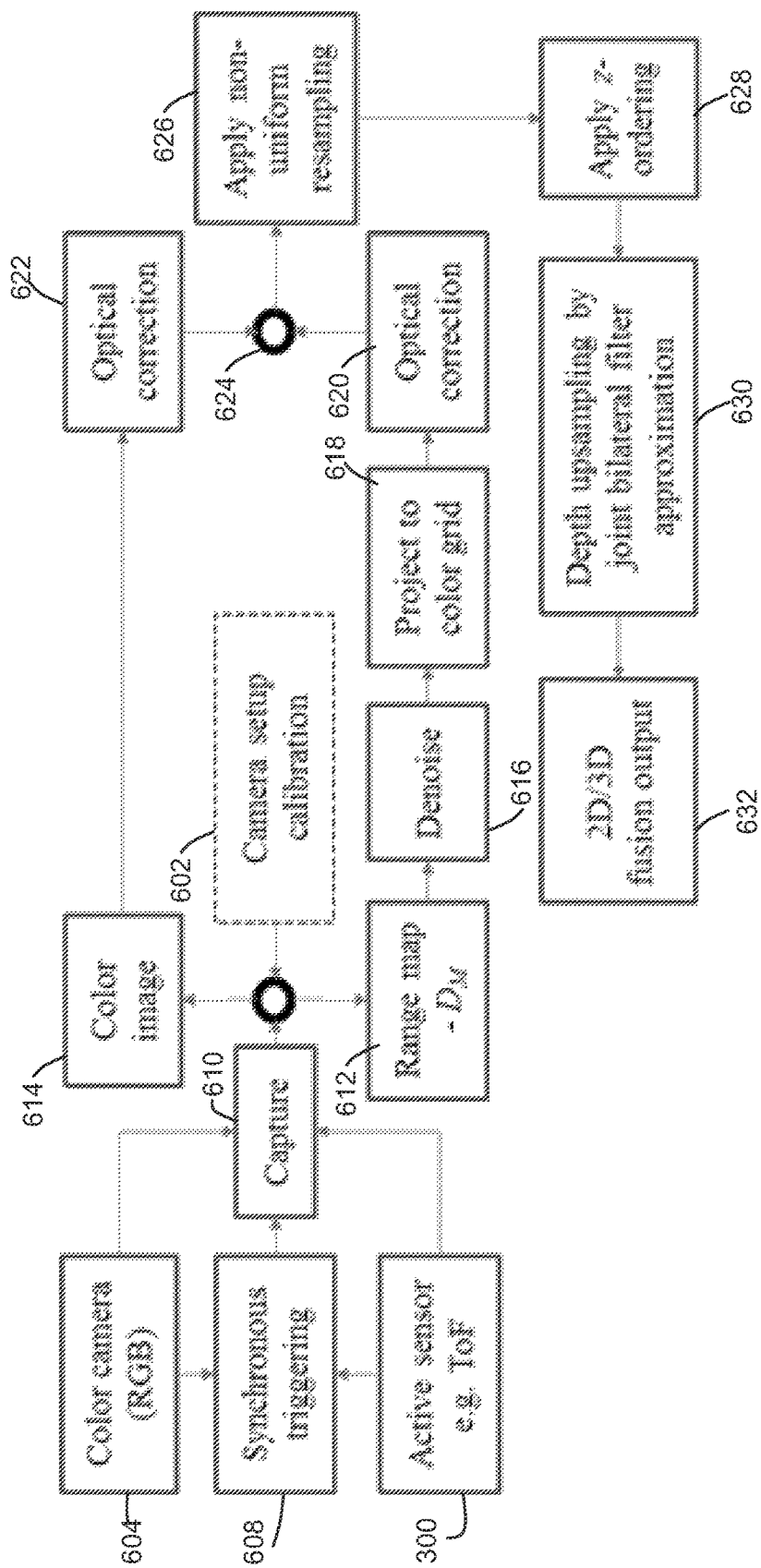
Figure 13:
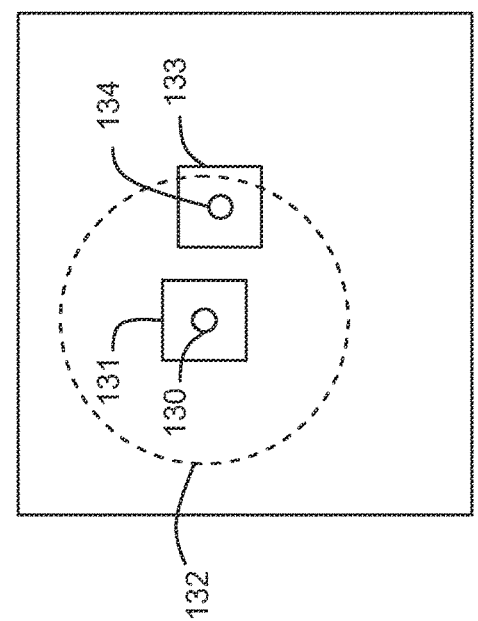
Figure 11:
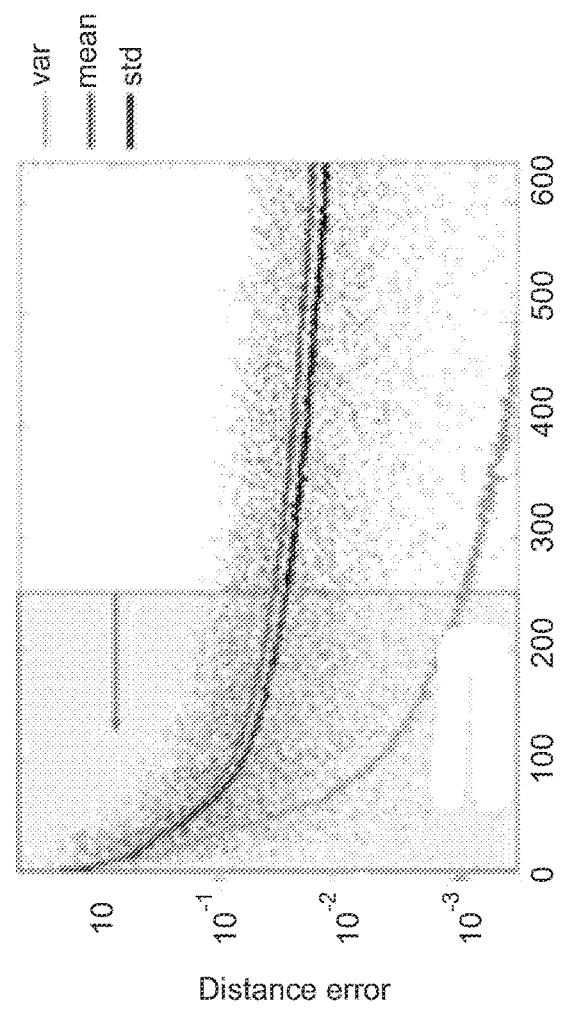
Figures 12A, 12B, 12C, 12D:
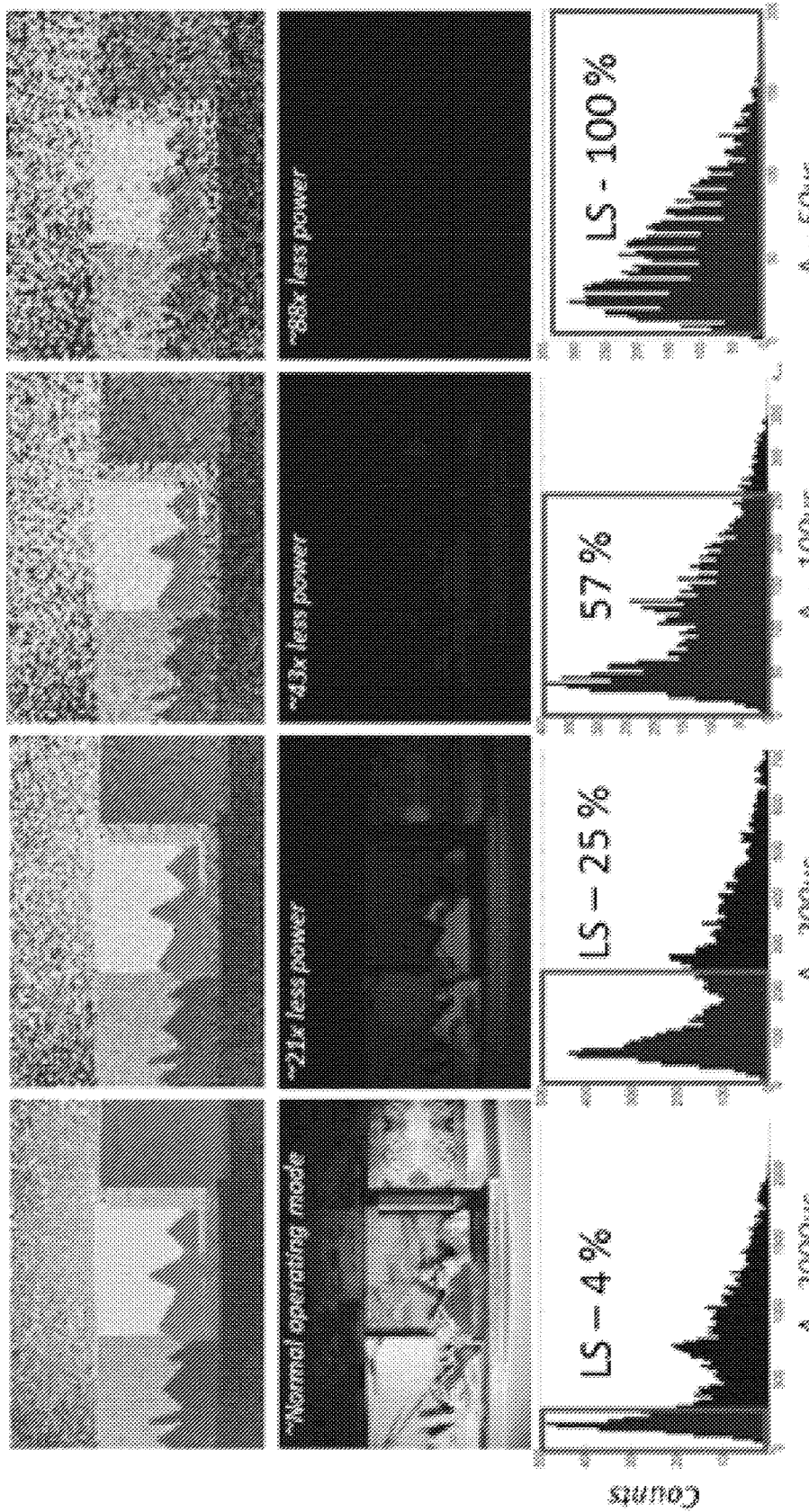
Figures 14A, 14B, 14C:
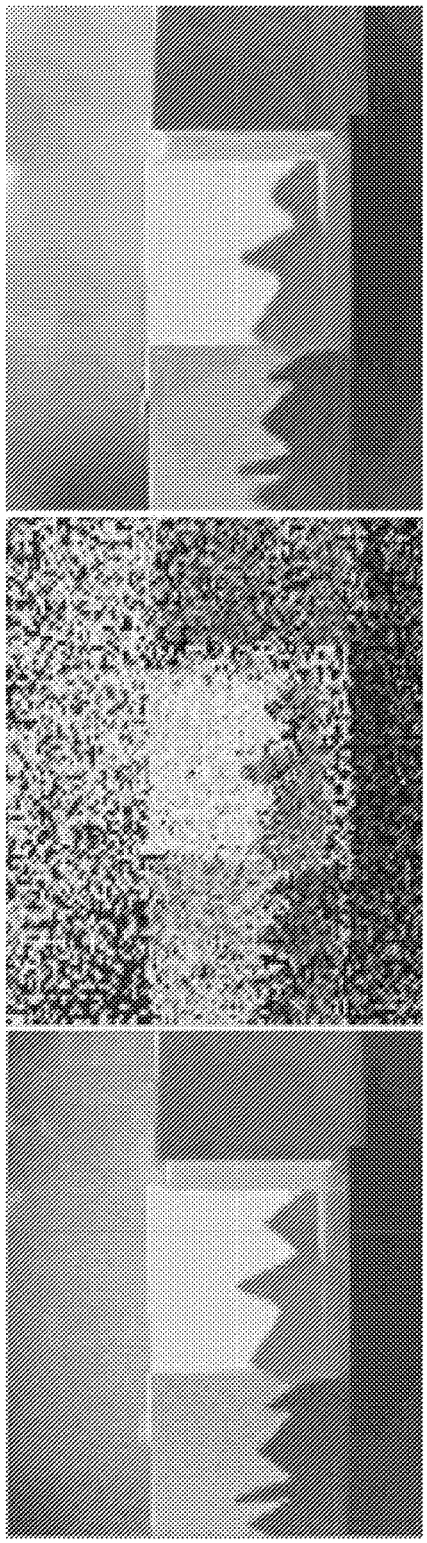
Figure 15C:
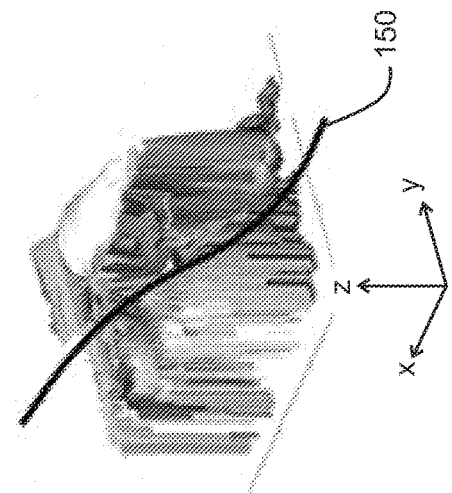
Figure 15B:
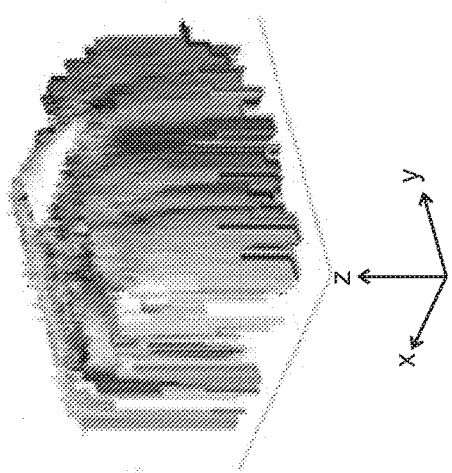
Figure 15A:
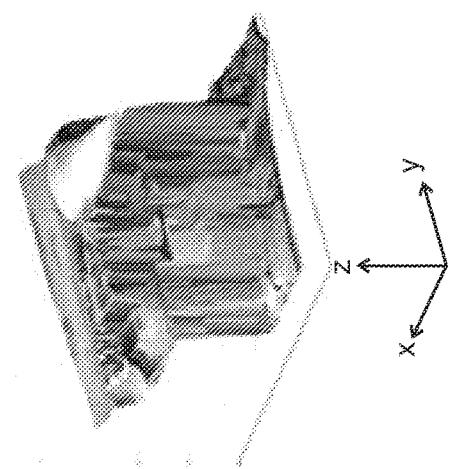
Figures 16A, 16B:
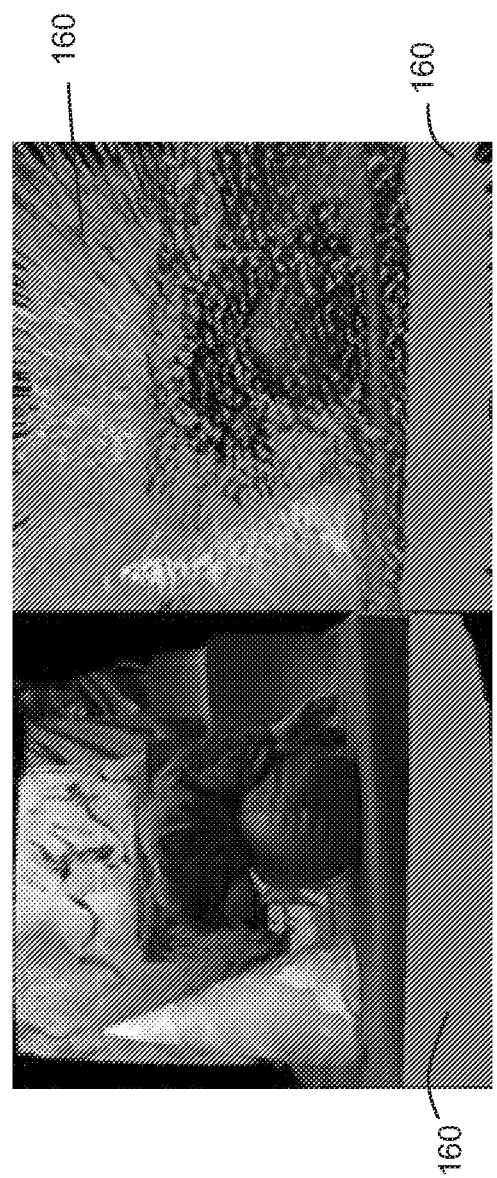
Figure 18:
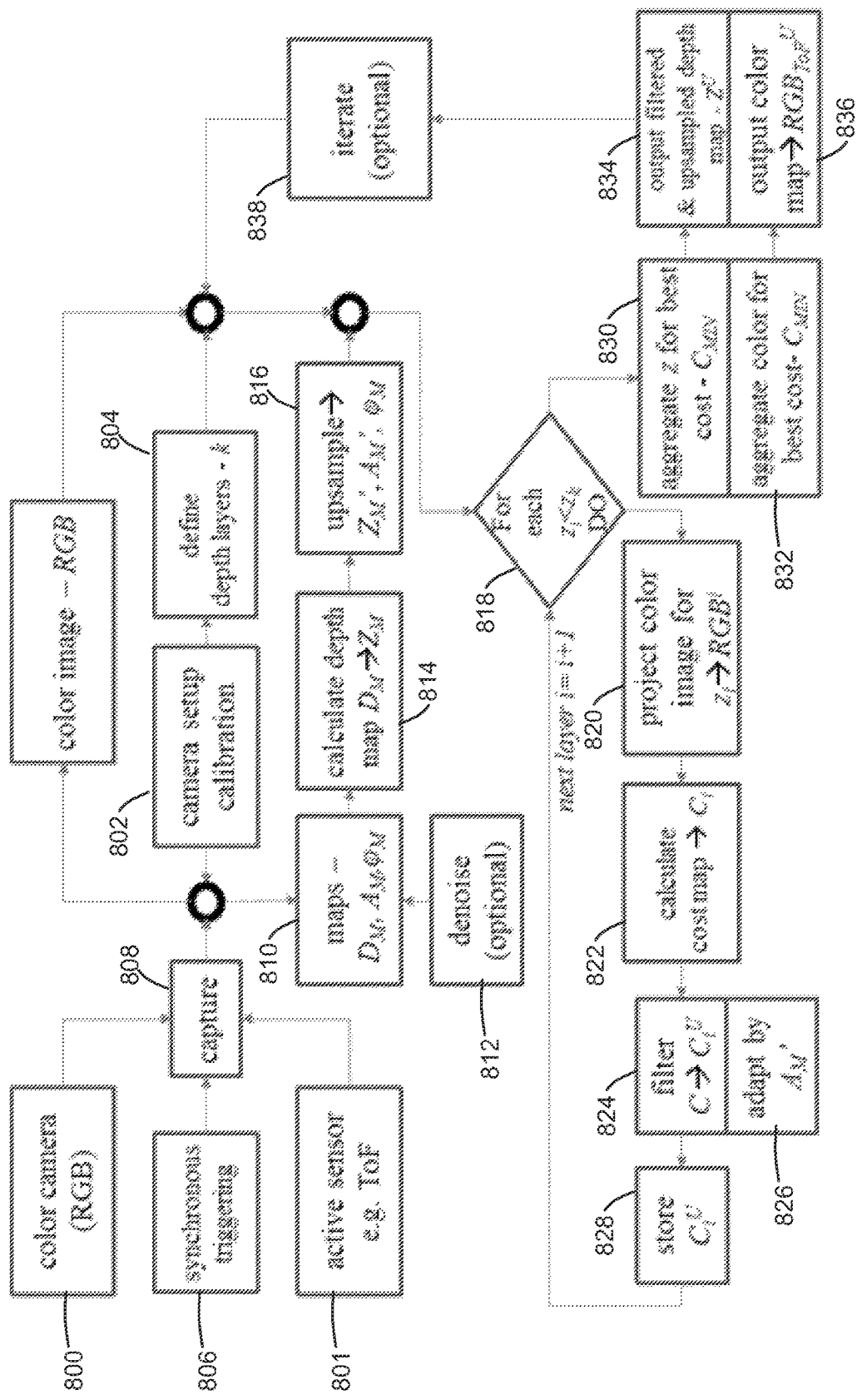
Figure 20:
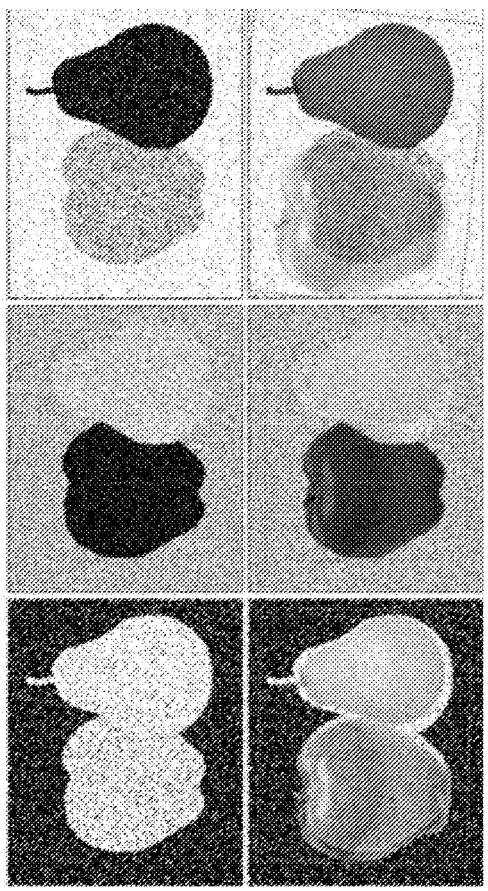
Figure 21:
Figure 22:
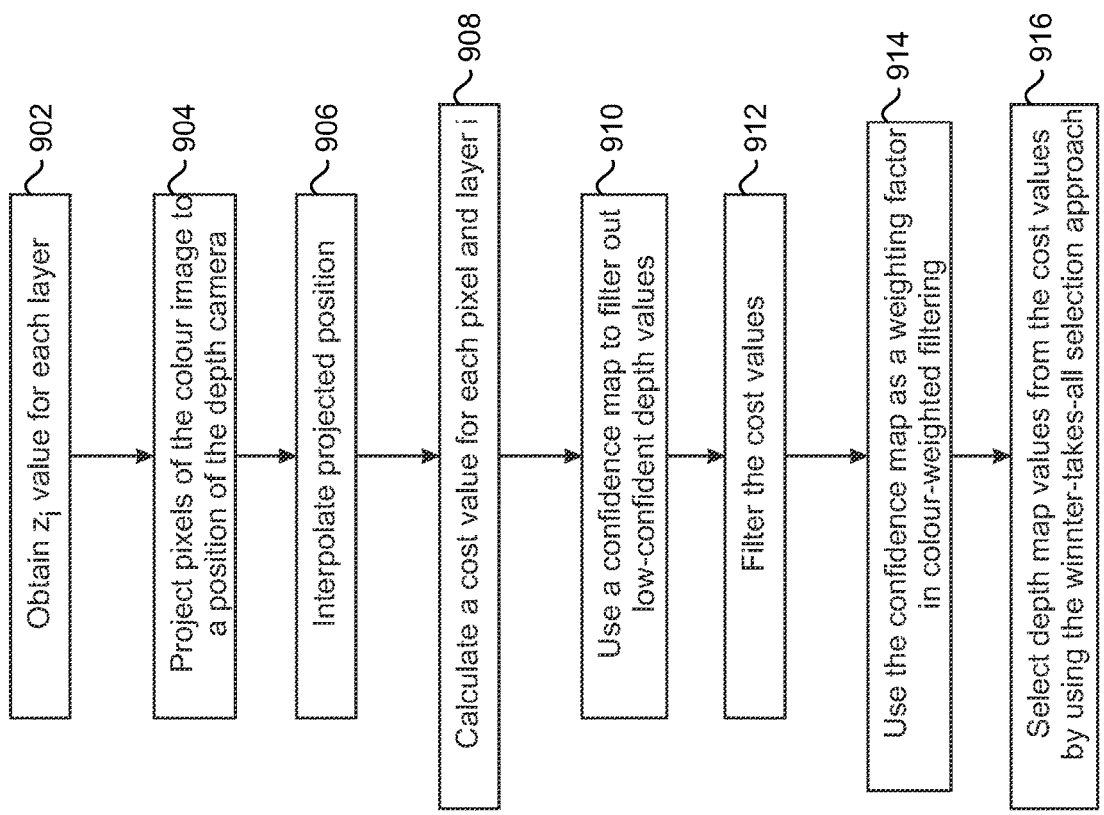
Figure 23A:
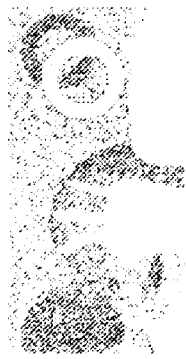
Figure 23B:
Figure 23C:
Figure 23D:
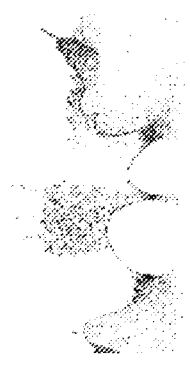

Having thus described certain embodiments of the invention in general terms, reference will now be made to the accompanying drawings, which are not necessarily drawn to scale, and wherein:

FIG. 1 depicts an example of an apparatus in which a method according to an example embodiment may be performed;

FIG. 2a depicts a pinhole model of a camera, in accordance with an embodiment;

FIG. 2b illustrates an example of relative pose definition of a camera setup by extrinsic parameters, in accordance with an embodiment;

FIG. 3 depicts an example of a ranging device;

FIG. 4 illustrates a principle of operation of the ranging device of FIG. 3, in accordance with an embodiment;

FIG. 5a illustrates a simplified example of a scene where two objects are visible, in accordance with an embodiment;

FIG. 5b illustrates how ranges may be converted to depth values in horizontal direction, in accordance with an embodiment;

FIG. 5c illustrates how ranges may be converted to depth values in vertical direction, in accordance with an embodiment;

FIG. 6 illustrates a framework of a fusion process, in accordance with an embodiment;

FIG. 7 depicts an example of output content for 2D/3D fusion process;

FIG. 8a depicts a detail of an example of a range sensor;

FIGS. 8b and 8c depict an example of projected range data in a colour sensor grid;

FIGS. 9a and 9b depict an example of an output of occlusion detection by a basic z-ordering algorithm;

FIG. 10a illustrates a simplified example of a scene;

FIG. 10b depicts an example of a range map obtained from the scene of FIG. 10a;

FIG. 10c depicts an example of an amplitude map obtained from the scene of FIG. 10a;

FIG. 11 depicts an example of an empirical estimation of a distance error;

FIG. 12a illustrates an example where a range sensor works in a normal mode;

FIGS. 12b-112d illustrate examples where the range sensor works in different low-power modes;

FIG. 13 illustrates a non-local denoising approach paradigm, in accordance with an embodiment;

FIG. 14a depicts an example of range maps for normal operating mode;

FIG. 14b depicts an example of range maps for low-powered mode;

FIG. 14c depicts an example of post-capturing denoised output;

FIG. 15a depicts an example of a result of 2d/3d fusion process for a normal operating mode;

FIG. 15b depicts an example of a result of 2d/3d fusion process for a low-powered sensing mode;

FIG. 15c depicts an example of filtered output of 2D/ToF fusion process obtained by 2D/ToF setup of the normal operating mode;

FIG. 16a depicts an example of z-ordering performance for a normal operating mode;

FIG. 16b depicts an example of z-ordering performance for a low-powered sensing mode;

FIG. 17 depicts an example of depth layering with corresponding values in a certain depth range;

FIG. 18 depicts an example of a filtering process;

FIGS. 19a-19d depict an example of a denoising process;

FIG. 20 depicts an example of projected range data in a colour sensor grid;

FIG. 21 depicts examples of filtered cost maps for several depth layers;

FIG. 22 is a flow diagram of a process according to an example embodiment.

Figure 26:
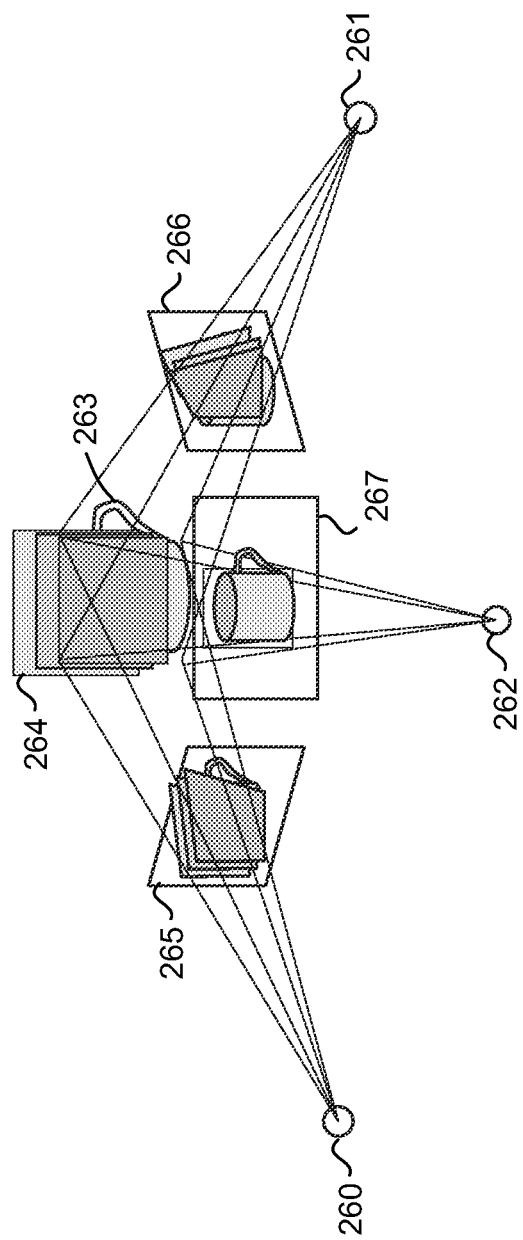
Figure 27:
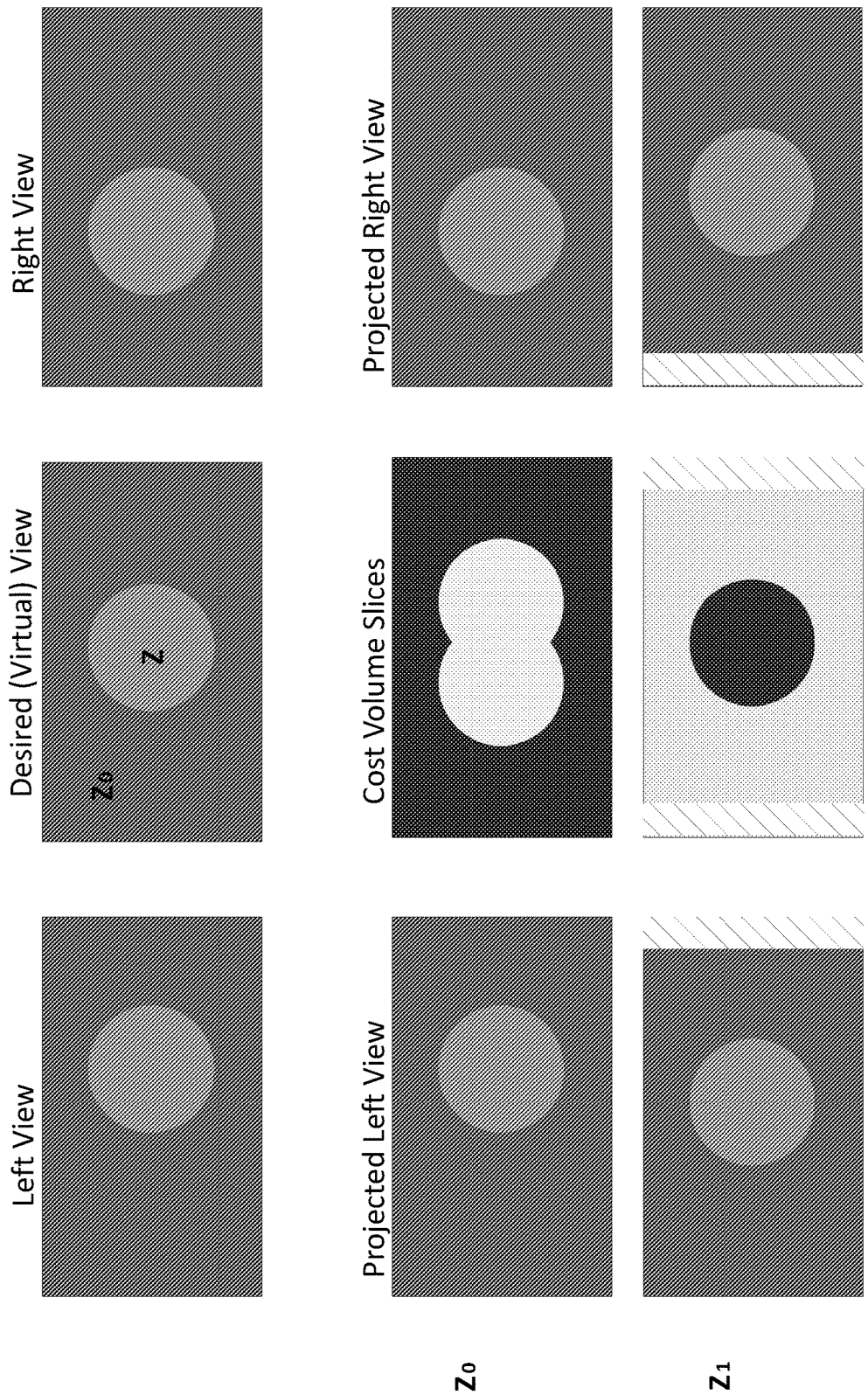

FIGS. 23a-23d show examples of initial cost volume slices for different depth hypothezises;

FIGS. 24a-24d show experimental results for a synthesized data set;

FIGS. 25a-25d illustrate some cost volume slices filtered with cross-bilateral filter for the same four depth hypothezises, in accordance with an embodiment;

FIG. 26 illustrates a generic view interpolation scheme with plane-sweeping approach, in accordance with an embodiment;

FIG. 27 illustrates a dis-occlusion problem, in accordance with an embodiment;

FIG. 28 illustrates that at certain areas around the foreground object, winner-takes-all selection based on the cost volume may not be able to choose correctly the depth hypothesis, in accordance with an embodiment;

FIGS. 29 and 30 illustrate examples of using projected left and right images to prepare a cost volume slice filtered with the projected left image and a cost volume slice filtered with the projected right image; and FIG. 31 illustrates an averaging performance according to an example embodiment.

DETAILED DESCRIPTION

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

Referring now to FIG. 1, an apparatus 20 that may be embodied by or otherwise associated with a mobile terminal (e.g. a cellular phone, a personal digital assistant (PDA), a digital camera, a smartphone, a tablet computer or the like) or another kind of computing device (e.g. a server, a PC, etc.) may include or otherwise be in communication with a processor 22, a memory device 24, a communication interface 29, a user interface 25, a device interface 23, and one or more cameras 26, 27, 28. In some example embodiments, the processor 22 (and/or co-processors or any other processing circuitry assisting or otherwise associated with the processor) may be in communication with the memory device 24 via a bus for passing information among components of the apparatus 20. The memory device 24 may include, for example, one or more non-transitory volatile and/or non-volatile memories. In other words, for example, the memory device 24 may be an electronic storage device (e.g., a computer readable storage medium) comprising gates configured to store data (e.g., bits) that may be retrievable by a machine (e.g., a computing device like the processor). The memory device 24 may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device 24 could be configured to store instructions for execution by the processor 22.

The apparatus 20 may, in some embodiments, be embodied by a mobile terminal. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading. In the embodiment in which the apparatus 20 is embodied as a mobile terminal, the processor may be embodied by the processor of the mobile terminal.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The communication interface 29 may be any means such as a device or circuitry embodied in either hardware or a combination of hardware and software that is configured to receive and/or transmit data from/to a network and/or any other device or module in communication with the apparatus 20. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In order to support multiple active connections simultaneously, such as in conjunction with a digital super directional array (DSDA) device, the communications interface of one embodiment may include a plurality of cellular radios, such as a plurality of radio front ends and a plurality of base band chains. In some embodiments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some example embodiments, such as instances in which the apparatus 20 is embodied by a mobile terminal, the apparatus may include a user interface 25 that may, in turn, be in communication with the processor 22 to receive an indication of a user input and/or to cause provision of an audible, visual, mechanical or other output to the user. As such, the user interface 25 may include one or more of, for example, a keyboard, a mouse, a joystick, a display, a touch screen(s), touch areas, soft keys, a microphone, a speaker, or other input/output mechanisms. Alternatively or additionally, the processor may comprise user interface circuitry configured to control at least some functions of one or more user interface elements such as, for example, a speaker, ringer, microphone, display, and/or the like. The processor 22 and/or user interface circuitry comprising the processor may be configured to control one or more functions of one or more user interface elements through computer program instructions (e.g., software and/or firmware) stored on a memory accessible to the processor (e.g., memory device and/or the like).

The one or more cameras 26, 27, 28 may comprise a light field camera, also called a plenoptic camera. One method of light field capture is by using a micro-lens array between the main-lens and the sensor; similarly, it can also be generated by an array of cameras placed close to each other. A light field camera takes a four dimensional image of a scene. Post-processing of the captured images in the sensor permits the camera system to refocus an image on a computer. Depth information can be extracted from the several images of the same scene, providing the information that permits image parts that are not in focus to be corrected. In alternative embodiments, one or more of the cameras 26, 27, 28 may also function as a stand-alone device not associated with a mobile terminal 20. In case of captured images from light field cameras, for each captured image one can obtain multiple view angled images which have different centres of projection.

The cameras 26, 27, 28 may also include a time-of-flight camera or other camera capable to provide range data for the construction of the depth maps.

In the following description some example embodiments are described. Many of the actions described below may be performed by one or more processors, such as the processor 22 of the device 20. However, some of the actions may also be performed in a distributed way, wherein more than one apparatus and more than one processor may be involved and communication between the apparatuses and/or processors may take place at some appropriate moments.

In the following embodiment, an example of a camera capturing model is described in more detail with reference to FIGS. 2a and 2b. Capturing parameters 200 of a camera may be called as intrinsic parameters (or shortly "intrinsics"). In this embodiment, a common capturing model called "pinhole model" may be adopted. A camera can be described by the pinhole model by using the following parameters depicted in FIG. 2a: optical centre 202 (O), field-of-view angle 204 $FOV_{(vv, hh)}$ in both vertical v and horizontal h directions, focal length $f_{(vv,hh)}$ in both vertical (vv) and horizontal directions (hh), principal point 206 $pp_{(u,v)}$ in vertical and horizontal pixel coordinates of the camera sensor 304, and sensor size $ss_{(w,h)}$ in width(w) 208 and height(h) 210.

The focal length $f_{(vv,hh)}$ is a parameter giving a relation between world and pixel coordinate systems and may be calculated as follows:

$$f_{(vv,hh)} = ss_{(w,h)}\tan\left(\frac{FOV_{(vv,hh)}}{2}\right)^{-1} \tag{1}$$

Extrinsic parameters may describe camera pose and position according to the position of the optical centre O in world space and may be given as follows: a rotation matrix $R_{[3\times3]}$ and a translation vector $T_{[3\times1]}$. The two parameters may be combined for comfortable use into a single matrix P called projection matrix as follows:

$$P_{3\times4} = K \times \lfloor R_{[3\times3]}, T_{[3\times1]} \rfloor, \tag{2}$$

where × is matrix multiplication, $(\cdot)^T$ is a transpose operator, and K is an intrinsic camera matrix defined as follows:

$$K_{[3\times3]} = \begin{bmatrix} f_{vv} & 0 & p_v \\ 0 & f_{hh} & p_u \\ 0 & 0 & 1 \end{bmatrix} \tag{3}$$

The rotation matrix R defines the camera pose as a sequence of axis rotations in terms of Pitch($\psi$), Yaw($\xi$), Roll($\theta$) angles and can be defined for example as:

$$R = R_\xi \times R_\theta \times R_\psi = \begin{bmatrix} \cos(\xi) & -\cos(\theta)\sin(\xi) & -\sin(\xi)\sin(\theta) \\ \cos(\psi)\sin(\xi) & \cos(\psi)\cos(\xi)\cos(\theta) & -\cos(\theta)\sin(\psi) - \cos(\psi)\cos(\xi)\sin(\theta) \\ \sin(\psi)\sin(\xi) & \cos(\psi)\sin(\theta) + \cos(\xi)\cos(\theta)\sin(\psi) & \cos(\psi)\cos(\theta) - \cos(\xi)\sin(\psi)\sin(\xi) \end{bmatrix} \tag{4}$$

The pinhole camera model allows calculating pixel projection of a world point I with world coordinates (X, Y, Z) into coordinates $(u, v)_I$ in a camera sensor grid:

$$(u',v',w)_I = P \times (X,Y,Z,1)^T, (u,v)_I = (u',v')_I / w_I \tag{5}$$

Due to distortions of the optical system, additional data transformations may be performed in order to achieve more exact projection alignment $(u,v)^U_I$. Optical distortion coefficients are stored in vector $d_{5\times1}$ which models radial and tangential distortion effects:

$$(u,v)^U_I = (1 + d_1 \cdot r_U^2 + d_2 \cdot r_U^4 + d_5 \cdot r_U^6) * (u,v)_I + tx((u,v)_I),$$
$$r_U = \sqrt{u_I^2 + v_I^2}, \tag{6}$$

where tx defines the tangential distortion function. The same optical modelling function may be used for remapping process.

FIG. 2b illustrates an example of relative pose definition of a camera setup by extrinsic parameters in accordance with an embodiment. The point 212 illustrates the position of the focal point of a reference camera 216 and the point 214 illustrates the position of the focal point of the camera 218 with respect to the focal point 212 of the reference camera 216. The distance of the position of the camera 218 from the reference camera 216 is depicted with the straight line B. The reference camera 216 is, for example, a time-of-flight camera.

Accurate depth sensing is one issue concerning 3D video output generation. There are many approaches to obtain scene depth information. While there are variations of the technology, an active sensing camera acquires range (or distance) data by using active sensing illumination as a reference. For example, a structured light illumination of a random pattern or time-of-flight sensing principle may be used. The latter deliver per pixel distance information with high frame rates and thus may be suitable for dynamic scene capturing. A beamer illuminates the whole scene with near-infrared light and an image sensor senses the light reflected back by scene objects. For every pixel in the sensor array the correlation of the received reflected light with the phase-shifted reference signal may be independently computed. An output called a range data map (or range image) DM may then be produced for all pixels in the sensor array. The calculated phase-delay output of the mixed signal is proportional to the sensed range. In case of dynamic scenes acquisition, time-of-flight sensors may be capable to deliver range images at real-time rates of better sensing quality.

FIG. 3 depicts an example of a ranging device 300 and FIG. 4 illustrates a principle of operation of the ranging device 300 of FIG. 3 utilizing an active sensing approach. The ranging device 300 comprises a light beamer 302, a sensor chip 304 (e.g. CMOS or CCD), and an electronic light modulator 306. The light modulator 306 may generate a sinusoidal stripe pattern that is illuminated by the light beamer 302 to a three-dimensional surface. The sensor chip 304 of the camera views through a lens system 308 the pattern that the stripes make when they illuminate the surface.

The beamer 302 may be made of an array of light-emitting diodes (LED) operating in near-infrared wavelengths (e.g. 850 nm). The beamer 302 radiates a point-source light of a continuously-modulated harmonic signal which illuminates the scene. The reflected light from object surfaces is sensed back by pixels of the sensor chip 304, which collects pixel charges for some period of time denoted as an integration time. For each pixel, the range data is estimated in relation to the phase-delay between sensed signal and the one of the light modulator. The coordinate Z may be called depth and is related to range D as depicted in FIGS. 5a to 5c. Time required for the light to travel from the beamer 302 to the object and back to the sensor 304 of the camera is approximately equal to twice the distance from the source to the object divided by the speed of light. Thus the time travelled by the flight may be used to determine the distance. Pixel values obtained by the sensor 304 represent the range map 406.

FIG. 5a illustrates a simplified example of the scene 400 where two objects 402, 404 are visible. The range map 406 covers an area of the scene 400 as a matrix in which each element (pixel) represents a range from the ranging device to a point in the scene. Hence, values of the elements indicate the range.

FIG. 5b illustrates how the ranges may be converted to depth values in horizontal direction and FIG. 5c illustrates how the ranges may be converted to depth values in vertical direction. The line 408 illustrates the distance between a focal point 410 of the ranging device 300 and a point I(X,Y,Z) of the object 402, 404, i.e. the range $D_1$ illustrated in FIG. 5a. The depth value may be obtained by projecting the range vector 408 to a vertical plane 412 of the sensor element on which the principal point 206 is located. In other words, the vertical plane 412 is the plane in which one of the x,y,z-coordinates is constant and is equal to the corresponding coordinate value of the principal point 206. If the horizontal coordinate is marked as an x-axis and the vertical coordinate is marked as a y-axis, x-coordinate of the vertical plane 412 is constant, e.g. zero, and, correspondingly, y-coordinate of a horizontal plane 414 is constant. In this model, the z-coordinate represents the depth. Thus, the projection value in horizontal direction can be calculated by using the range and the x-coordinate of a pixel 416 on the sensor 304 which sees the point I(X,Y,Z) of the object 402, 404. In other words, the point I(X,Y,Z) corresponds with the pixel 416 on the sensor 304.

The range value of the point I(X,Y,Z) of the object 402, 404 may be converted to depth e.g. as follows. The distance 418 of the principal point 206 from the focal point 410 may be assumed to be known on the basis of camera parameters. Hence, the distance 418 and the x-coordinate of the pixel 416 may be used to calculate the distance 420 from the focal point 410 to the pixel using e.g. the Pythagorean theorem. The depth 422 can be determined by multiplying the distance 418 of the principal point 206 from the focal point 410 by the ratio between the range value 408 and the distance 420 from the focal point 410 to the pixel. The depth value may also be obtained in vertical direction using the above principle but replacing the vertical plane 412 with a horizontal plane 414 (i.e. y-coordinate is constant) and x-coordinate of the point I(X,Y,Z) with y-coordinate of the point I(X,Y,Z). Corresponding range and distances are depicted with the same numerals in FIGS. 5b and 5c.

In the following a 3D capturing system assisted by an active range sensor is explained in more detail. In the system two or more separate devices responsible for colour (RGB) and range maps are combined. The combination may comprise a non-confocal camera setup of two or more devices sensing in two capturing modalities: colour (e.g. RGB) and range (D). Such 3D system may be called as a colour+depth systems or shortly RGB+D camera system.

An example of the pinhole model for such a setup may be represented more conveniently when one of the cameras is chosen as a reference. This means that for the reference camera, the optical centre coincides with the beginning of the world coordinate system (X=0, Y=0, Z=0). Every other camera in the setup will be defined by a relative shift T and pose R according to the camera chosen as the reference camera (see FIG. 2b). The norm of T may be called as a baseline B and is visualized on FIG. 2a as the length of the shortest distance between optical centres of the cameras.

Because of different technology involved and sensing principle, the capturing devices may not have the same parameters such as the sensor element size, camera intrinsics and resolution. A RGB+D camera setup can have, for example, a high-resolution RGB camera with a range sensor of the time-of-flight sensing principle. While high-definition colour cameras have quite large resolution and small pixel size (e.g. 1920×1080 pixels, pixel size about 8 μm), active range sensors may provide far lower resolution (e.g. 200× 200 pixels) for much bigger pixel size (e.g. about 150 μm). For that reason a capturing system may comprise modules for synchronous capturing, range data de-noising, data re-projection (or multi-sensor data alignment) and non-uniform to uniform resampling (e.g. upsampling to a higher-resolution grid of the RGB camera) and targets at composing high-resolution 3D video output usually denoted as 2D/3D fusion. A framework of an example of the fusion process is given in FIG. 6.

The example fusion process of FIG. 6 is shortly explained in the following. A camera setup may comprise an RGB camera 604 and a time-of-flight camera 300 (or other active range device) which have been calibrated (block 602 in FIG. 6). After the calibration has been performed, a synchronous triggering 608 may be initiated to capture 610 an image by the colour camera 604 and range information by the time-of-flight camera 300 and the captured data may be stored (blocks 612 and 614) to a memory.

An embodiment may also comprise applying denoising filter (block 616) on time-of-flight data utilizing e.g. a non-local means paradigm. The possibly denoised range map may be projected 618 to the colour grid of the colour camera 604 and optical correction may be applied to both the projected range map and the colour image (blocks 620, 622). The colour image may be used 624 to improve the accuracy of the range map. The projected range map may be resampled 626 to obtain resampled range image.

Z-ordering 628 and upsampling 630 may be performed on the range map to obtain the 2D/3D output 632 of the fusion process.

An output of 2D/3D fusion process can be, for example, mixed data modality content generally referred such as 2D+depth (2D+Z) and coloured surface meshes or point-clouds (c.f. FIG. 7). Possible applications are related to driving auto-stereoscopic 3D displays in real-time, 3D photorealistic content generation, augmented reality, and etc. Examples of RGB+D (or/and RGB+Z) data fusion is depicted in FIG. 7. In FIG. 7, the left most image 702 represents an example of an input RGB data map $RGB_M$, and the image 704 represents an example of an input range map $D_M$. The image 706 represents an example of a fused output as a surface mesh obtained on the basis of the input RGB data map $RGB_M$ and the input range map $D_M$. A fusion output as a view+depth format is illustrated with the image 708. The right most image 710 represents an example of an auto-stereoscopic display output obtained from the input RGB data map $RGB_M$ and the input RGB data map $RGB_M$.

There may be a problem of synchronous camera capturing when multi-sensor technology is utilized. Due to different capturing principles, cameras of multi-sensor setup might not completely trigger simultaneously the same capturing events. A solution for this may be to introduce redundant camera captures with shorter integration times in one sensor, which can reduce the amount of possible time delay between capturing events choosing more appropriate frame.

Having acquired 2D colour image together with range data map provided by the active camera sensor, a 2D+Z frame may be created by converting range to depth $D_M \rightarrow Z_M$ and assigning corresponding depth values z to every pixel of the colour image. However, the two cameras are not collinear, that is the positions of optical centres and view directions are different. Consequently, the two data maps of the observed scene are not mutually aligned. A projective-alignment correspondence between the depth and colour data may then be applied to overcome this, i.e. for every pixel of the depth sensor one tries to find the corresponding location at each position of the colour image. Generally, to obtain such depth-to-colour correspondence depth-warping (or depth-projection alignment) algorithm may be applied. It may comprise the following steps. First, range data is represented into global world coordinates, in such a way that each range pixel d(u, v) in $D_M$ becomes a 3D point (all representing world data point-clouds) in terms of a homogeneous coordinate $(X, Y, Z, w)^T$:

$$Z = f_{PMD} \cdot d(u,v) / \sqrt{f_{TOF}^2 + u^2 + v^2}$$

$$X = u \cdot z / f_{TOF}, Y = v \cdot z / f_{TOF}, w=1, \quad (7)$$

where $f_{TOF}$ is the focal length of the time-of-flight sensor. The second step is to project every 3D point on the image plane of the colour camera:

$$(u',v',w)_{RGB} = K_{RGB} \times P_{PMD \rightarrow RGB} \times (X,Y,Z,w)^T, (u,v)_{RGB} = (u',v')_{RGB}/w_{RGB} \quad (8)$$

where $P_{PMD \rightarrow RGB}$ is a projection matrix of the relative transformation between optical centres of the two cameras determined by the extrinsic parameters (T and R), and $K_{RGB}$ specifies intrinsic parameters of the colour camera. The calibration process is responsible for the estimation of camera capturing parameters that provides cross-modality camera relation for projection alignment step in terms of camera intrinsics and extrinsics.

High-resolution colour image may contain comprehensive information for up-sampling and denoising of the corresponding depth map. An aligned depth map may be successfully filtered and up-sampled with a colour-weighting filtering scheme. Probabilistic filtering separates roughly up-sampled depth to the number of hypothesizes, which construct a 3D cost volume when stacked together. Such cost volume is then filtered using cross-bilateral filter, where bilateral weights are estimated from the colour image. Such filtering may remove variations in cost volume slices that do not correlate with the image structures. Despite adjusting the object contours, this processing may also remove random noise in depth as well as small patches of systematic error. Backward conversion from the filtered cost volume to a depth map is done in a winner-takes-all manner, similar to what is used in the stereo matching: for each pixel, depth hypothesis that has a minimum cost value is selected as a final depth value. Simple interpolation technique can be introduced in the winner-takes-all selection in order to obtain sub-integer accuracy of the resulting depth maps.

Direct projection (alignment) of the low-resolution depth map to a position of a high-resolution colour sensor may be valid until the depth map is of good quality. In a controlled environment with specifically selected surfaces and materials, the noise of the acquired depth maps may be in the region, which does not prevent successful depth projection required for further processing. However, once systematic errors occur, or power of random noise exceeds a certain level, direct depth projection may become untruthful. Depending on a rendering technique (pixel-to-pixel, pixel-to-patch or mesh-based rendering), one wrongly estimated pixel of a depth map might degrade large area in the projected depth map.

In the following, non-uniform to uniform data resampling is described in more detail. When projected to the grid of the colour camera, the corresponding points may appear sparsely scattered between the pixel positions of the colour image. Filling the unknown depth values on the regular (high-resolution) grid position may be performed by non-uniform resampling techniques. For reasons of better sensitivity for near-infra red light, sensor elements of range camera may have much bigger sensing surface compared to one of modern colour cameras e.g. 150 μm>8 μm. For such setups, the projected data may not be correct to be considered as sample point, but rather as a patch that may influence several neighbouring regular pixels in a projected grid and additionally may burden the resampling process (FIG. 8a).

FIG. 8a illustrates a part of pixels 310 of the sensor 304 of the depth camera 300 forming a range sensor grid 312. Correspondingly, FIG. 8b illustrates a part of pixels 270 of the colour camera 604 forming a colour sensor grid 272. FIG. 8b also depicts how some range pixels 310 and corresponding parts of the range sensor grid 312 have been projected on the camera sensor grid 272.

Depth data has the specifics of piece-wise smooth surface (c.f. FIG. 7), which offers some simplifications of resampling process making use of triangulated non-uniform bilinear re-sampling (FIG. 8b). The idea is to project three or more nearest range pixels, to apply a surface fit according to their projected position and then resample regular pixels that the surface covers. This is illustrated in FIG. 8c as a bilinear triangulation resampling principle. Such resampling approach may have another benefit for the fact that it provides easy mechanism for occlusion detection by z-ordering. The projection alignment, non-uniform resampling steps and occlusion detection may be denoted in a single step called "rendering".

In the following, occlusion and hidden areas detection by z-ordering is described in more detail. Non-uniform data may not provide accurate estimation and masking of occluded and hidden data, which could distort resampling process. Due to different viewing directions and position of the cameras, occlusion artifacts may appear on the rendered depth map. Occlusion artifacts may be visible in the areas of the depth map surface which become occluded when seen from the colour camera view. For these samples, the resampling procedure assigns erroneous information as it warps to the same region of the texture map as the occluding ones.

An example approach to detect erroneous data assignments is to adopt a depth ordering technique (z-ordering). A basic z-ordering comprises at least two passes. In the first pass, the scene viewed from the point of the colour camera is rendered to a frame buffer. The frame buffer stores minimal per-pixel depth $z_{MIN}$. In the second pass, the scene is rendered again from the viewpoint of the colour camera, but for every fragment its z-coordinate is compared to the value of the z-buffer entry with the same (u, v) coordinates: if the current z value is bigger than the one stored in z-buffer, i.e. there is something in between the current fragment and the light source, the fragment is considered to be in occlusion. An example of an output of occlusion detection by basic z-ordering algorithm is depicted in FIGS. 9a and 9b. FIG. 9a depicts rendering of non-detected occlusion areas of an image 90, and FIG. 9b depicts rendering of detected occlusion areas 92.

A time-of-flight camera sensing principle may operate as follows. The phase-delay estimation is performed as a discrete cross-correlation process of several successively captured samples taken between equal intervals during the same modulation periods of fixed frequency. The sample data may be denoted as Rn (n=1, 2, ... N−1, N≥4). The mixed signal components (amplitude and phase) are estimated from the sampled data as follows $$A = \frac{2}{N}\sum_{n=0}^{N-1}\left|R_n e^{-j2\pi\frac{n}{N}}\right|, \varphi = \arg\left(\sum_{n=0}^{N-1} R_n e^{-j\frac{2\pi n}{N}}\right) \quad (9)$$

where A is the modulation amplitude, and j is the imaginary unit. The sensed distance D is proportional to the phase $$D \propto \frac{\varphi}{4\pi F} c_L, \quad (10)$$

where F is the frequency of the emitted signal and $c_L$ is the speed of light through dry air (~298.109 km/h). The value of D is calculated after calibration of the sensor. All pixels of time-of-flight sensors produce maps for amplitude $A_M$ and phase data $\varphi_M$ correspondingly. An example of visual content for range and amplitude captures is given in FIGS. 10a-10c, in which FIG. 10a illustrates a scene, FIG. 10b depicts a range map obtained from the scene of FIG. 10a, and FIG. 10c depicts an amplitude map obtained from the scene of FIG. 10a. The sensing principle may have the limitation of phase wrapping effect (Eq. 9), which limits the sensing to close range (e.g. 0÷7.5 meters). The range could be extended by changing frequency F, but it may result in loss of range precision (Eq. 10).

The measured signal amplitude may be an optimal estimator for the reliability of range measurements. That is expressed by a relation between the variance of measured error $E_D$ of the sensed D, denoted by $\sigma^2$ and the modulation amplitude $$\sigma^2 \propto \frac{1}{A^2} \quad (11)$$

An empirical estimation of the distance error $E_D$ proving Eq. 11 is plotted in FIG. 11. As seen in the figure, high measurement error is related with very low-amplitude signals which thus indicate a poor sensing environment. An amplitude threshold can delineate the operating range. The squared area illustrates the poor sensing environment.

Erroneous sensing environment can be caused by both sensory-internal and external causes. Internal factors include low power of the emitted signal or short integration time for forming the reflected signal samples. External factors include reflection from surfaces of small incident angles, sensing objects having low-reflectivity materials or colours, objects situated close to the range sensing limit, signals formed by multiple reflections. The effect of such factors is an erroneous range image where errors are manifested as noise. FIG. 12a illustrates an example where the sensor works in a normal mode. This mode is characterized by histogram of measured amplitudes ranging from 200 to 8000 units thus well above the empirical threshold for that model of 200 units. Integration time of the depth camera in this example is 2000 μs. Depictions in FIGS. 12b-12d illustrate the case where all amplitudes are below the threshold. Integration time of the depth camera in these examples are 200 μs, 100 μs and 50 μs, respectively.

In FIGS. 12a-12d the uppermost picture depicts an example of a depth map, the picture in the centre depicts an example of a corresponding amplitude map, and the lowest picture depicts an example of a corresponding histogram.

While the amplitude map looks structurally intact, the distance map is grainy (noisy). Furthermore, there might be erroneous distance measurements even when the amplitude is relatively high. Such cases may be caused by e.g. objects with very high reflectivity, which become additional light sources for other objects thus causing multiple reflections. Strong ambient light containing the same wavelength as of the emitted signal (e.g. sensing outdoor scenes under sun light) may also be a source of measurement errors. Such errors may be manifested in the distance map as structural artifacts rather than as a noise. Of particular interest is the case when the time-of-flight sensor is forced, by technological limitation, to work in low power or short integration time mode (e.g. requirements for miniaturization leading to limited beamer size, decreased number of LED elements; embedding into portable low-power devices; cost of hardware). A remedy for such cases would be to introduce a denoising procedure applied to the computed distance map in a post-measurement stage.

Each scene of a closed depth range can be represented as a stack of depth planes i∈[0÷k−1]. For every plane there is a projective transformation that maps the points of the same planar scene from one camera image plane to another, i.e. homography. Using this property, we can approximate the projection alignment procedure to a very high precision avoiding non-uniform resampling step by performing it in a reversed way (a back-projective way). Consider projection matrix of a reference camera PRef=KRef·[I|0] (world origin is defined at this camera) and target camera pose is defined by rotation matrix R and translation vector T to the reference camera. The homography $H_i$ induced by the plane $z=z_i$ is:

$$H_i = K_{Tem} \times (R + T \times [0,0,1/z_i]^T) \times K_{Ref}^{-1} \quad (12)$$

The back-projected coordinates are obtained by applying the inverse transformation $H_i^{-1}$ and then corresponding values are interpolated using the surrounding regular coordinates of the available data that belongs to the layer map. The obtained interpolated values are used to fill in the corresponding values on the target camera image grid. In this way, by processing every layer the novel view can be rendered.

In a similar manner, a plane sweeping approach applies for estimating depth maps, when a calibrated setup of two or more RGB cameras are available. The plane-sweeping algorithm may be applicable to resolve a number of problems of geometric nature in the three-dimensional space. In general, plane-sweeping method suggests resolving high-dimensional problem locally, as a lower dimensional sub-problem, using a simply defined plane of interest. This plane however is moved ("swept") across the given 3D space, so a number of sub-problems is resolved independently. The final solution is taken as a combination of the most successful local solutions such that it may optimize some desired objective functions.

The plane-sweeping methodology may be applicable for some 3D vision tasks, such as stereo-matching or virtual view synthesis. Introduction of the plane-sweeping strategy to the depth-from-stereo problem may allow operating with non-rectified cameras in the same manner as they would be rectified (e.g. pixel correspondence search remained to be 1D problem, even though corresponding pixels are not located on the same horizontal line). Despite removing of redundant (and complicated) rectification step, such strategy may become especially beneficial for multi-camera matching where trustful multi-camera rectification may be impossible.

For plane-sweeping, it is considered that depth map of a target camera should be estimated. For assumed depth layer $z_i$, all data of each camera image grid are back-projected onto the target camera grid in the same manner as explained above. For each back-projection of assumed depth, a cost similarity function between data of target camera and back-projected one is applied and assumed depth layer $z_i$ is indexed. Finally, best cost for all back-projected layers is fused for indexed layers $z_i$, i∈[0, k−1] to provide the best depth map estimate. For a cost estimate a block matching function by pixel-wise similarity metric (e.g. SAD, SSD, NCC, and etc.) may be utilized.

A non-local denoising paradigm tries to find and stack similar blocks (patches) of pixel data together and utilize their similarity measures as weights in a filtering process based on averaging. The reference for similarity is chosen as a block or patch of pixels that surrounds the filtered pixel. In FIG. 13 the filtered pixel is depicted with the reference numeral 130, the spatial neighbourhood of the pixel is depicted with the reference numeral 131. A search neighbourhood from which a similar block may be searched is depicted with the reference numeral 132. FIG. 13 shows another pixel 133 and a corresponding spatial neighbourhood 134 which may be determined to have some similarity with the filtered pixel 130. The denoising solution may be based on the approach called non-local means (NLM). However, other non-local transform-domain filtering schemes may also be possible. The general NLM approach for filtering a pixel U(u,v) is depicted in FIG. 13 and may be defined as follows:

$$U'(u,v) = \frac{1}{W_N(u,v)} \sum_{(s,r)\in\Omega_{(u,v)}} \exp\left(-\frac{G\times(\|U(s+\cdot,r+\cdot)-U(u+\cdot,v+\cdot)\|)(0)}{2\sigma_F^2}\right) U(s,r) \quad (13)$$

$$W_N(u,v) = \sum_{(s,r)\in\Omega_{(u,v)}} \exp\left(-\frac{G\times(\|U(s+\cdot,r+\cdot)-U(u+\cdot,v+\cdot)\|)(0)}{2\sigma_F^2}\right),$$

where exp is exponential function, $U_M$ is pixel map with filtered output $U_{M'}$, $W_N$ is a normalization factor, G is a Gaussian kernel, $\Omega(u,v)$ defines pixel search neighbourhood (search patch) around coordinate (u, v), (s, r) is a centred pixel coordinate in $\Omega(u,v)$, $\sigma_F$ is a filter parameter, ×(·)(0) is a centred convolution operator, and (+·) is a pixel indices of spatial neighbourhood. Basically, the signal components of φ and A of the sensed signal may be regarded as components of a complex-valued variable $U \rightarrow U_{CMPLX} \exp(j\varphi_M)$ and processed together in a single step. This may impose better filter adaptivity and similarity weighting. The complex-domain filtering may provide additional feedback in the form of improved noise-level confidence, which can be utilized in iterative de-noising schemes. Additionally, pre-filtering of individual components may suppress structural artifacts.

For mobile applications, the active sensors for range data (e.g. ToF sensors) may be set to compromise sensing hardware or parameters of normal operating mode with the aim to decrease power consumption, increase the capture speed, improve synchronous capturing or decrease the amount of motion artifacts. Such compromise in sensing mode may be obtained by shortening the integration times of captures, introducing low-powered beamers, or decrease the amount of sensing pixels and increase their size for better sensitivity. Such operating mode will be denoted as "low-powered sensing mode" in this specification. FIGS. 14a-14c illustrate denoising of low-powered sensing environment in ToF camera: in FIG. 14a range maps $\varphi_M$ for normal operating mode are depicted and in FIG. 14b range maps $\varphi_M$ for low-powered mode are depicted. FIG. 14c depicts post-capturing denoised output.

Such operating mode may lead to extremely noisy range images of very low resolution when compared to resolution of a colour camera. For 3D camera setups such degradation on range data is considered not only as visual, but rather than as a distortion in projective mapping function in 2D/3D fusion process. The 2D/3D fusion will have an "amplified" effect on degraded output. An example is illustrated in FIGS. 15a-15c. In FIGS. 15a-15c x- and y-axes depict the x- and y-coordinates of the depth map and z-axis depicts the depth values, wherein the depth values are illustrated like a relief map. One can observe from there that while the original noisy range data has yet some distinguishable scene structure, the fused output is completely degraded and useless in practice (FIG. 15b) which may be deduced from the largely varying depth values within a small region. Moreover, the process of surface based z-ordering may become extremely unstable, where no particular confidence of occluded and hidden data 160 is estimated (c.f. FIGS. 16a and 16b). This can be seen from the large variations of the depth values on the left side of the line 150 in FIG. 15c. On the right side of the line 150 the depth values are more constant. The reason for this is due to noise influence in projected position which may result in data artifact that the covered area of rendered surface is severely expanded and shadows huge amount of true data.

Noise reduction as a post-capturing process may improve 2D/3D fusion process of a 3D camera setup assisted by non-confocal RGB of high resolution and ToF range device working in low-powered sensing mode (low-powered 2D/ToF setup). In such approach, a 3D camera setup of such kind may be deliberately designed to perform in low-powered sensing mode for which post-denoising process performs favourably and filtered output of 2D/ToF fusion process resemble the one obtained by 2D/ToF setup of normal operating mode (c.f. FIG. 15c).

In the following, an embodiment of a denoising approach for range data is described in more detail. The approach comprises a filter technique which embeds denoising, projection alignment, and upsampling steps in 2D/ToF fusion process in a mutual process that may avoid explicit non-uniform resampling approach and z-ordering of projected data. In this approach, a new modality is introduced. It comprises a stack of several shifted colour images with assigned depth values $z_i$, $k \in [0, k-1]$ back-projected by homography transform in a range device sensor grid that serves as weights of confidence in filtering process. The projection mechanism for such data depends only on camera sensing range, extrinsics and intrinsics of cameras in the setup (particularly on their relative baseline, and focal lengths) avoiding use of captured range data (since it may be a source of noisy estimation). For each projected colour image $RGB_i$, a cost map $C_i$ of depth consistency between captured noisy data and $z_i$ is calculated (see FIG. 17). Then, each cost map is filtered independently and output is obtained by aggregating data for each pixel of the best resulted cost. Basically, each cost map may help the filtering process to mask inappropriate regions of corresponding projected colour map that has low cost confidence assuming that such does not map accurately particular objects in the scene. Such modality of confident colour data may be considered as an additional independent data source that may be utilized to improve output by applying filter techniques based on cross-modality adaptive filtering.

The diagram on the left side of FIG. 17 the x-axis depicts the pixel shift (disparity) as a function of depth; the y-axis depicts depth values; and the horizontal lines depict different depth layers i. The lines 171 in the box 170 on the right side of FIG. 17 illustrate some object boundaries in the scene, viewed from top.

Such modality may provide highly-detailed texture content, which may be unavailable for range data alone, may bring color data content naturally rich in textures, may have higher pixel resolution than original range data and may provide comfortable environment for denoising techniques. Usually range data is textureless and has nature of piecewise smooth content (see, for example, FIG. 14a). The denoising approach may avoid disambiguities of projection alignment process of noisy range data, where projected positions of range data can deviate from their real position (avoiding projection noise). It may also avoid non-uniform data resampling step and disambiguation of wrong z-ordering output and occlusion detection. The denoising approach may be utilized for other range devices of active sensing approach (e.g. structured light), where similar low-powered sensing mode is applicable.

An example embodiment of the filtering process is depicted in FIG. 18 and is explained in the following with reference to an example 3D camera setup of non-confocal cameras. The setup comprises an RGB camera 800 and a time-of-flight camera 801 (or other active range device) which have been calibrated (block 802 in FIG. 18). The active sensor of the time-of-flight camera operates in a low-sensing mode, and may have a very low-sensor resolution (e.g. 120×160) and the size of the sensor element may be relatively big (e.g. 150 µm).

Figure 19:
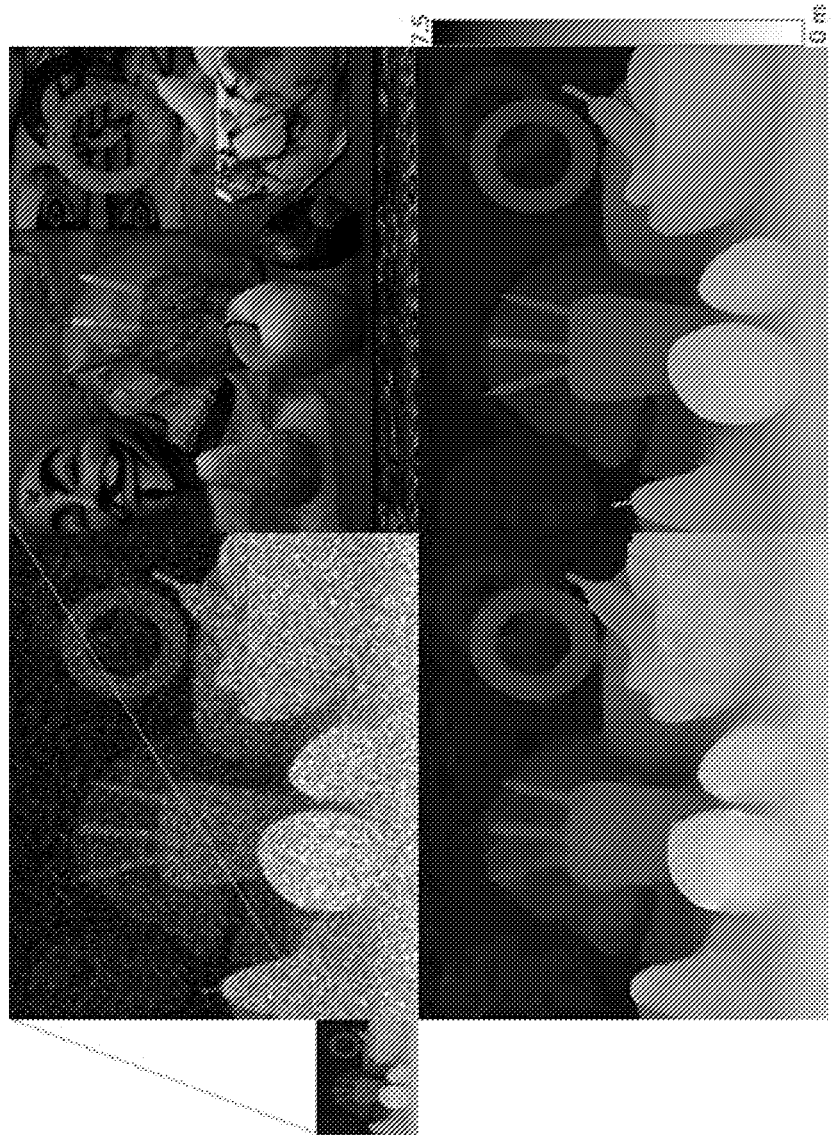

The active sensor device may operate in sensing data of limited range (e.g. 0.5-7.5 m). The resolution of the RGB camera may be e.g. 800×600 with sensor element size 8 µm. An example embodiment of the filtering framework is applied which produces a denoised and upsampled output that resembles Ground truth (GT) as illustrated in FIG. 19b. FIG. 19d depicts an example of a scene from which the output of FIG. 19b has been obtained, FIG. 19a illustrates a noisy input, and Ground-truth depth is illustrated in FIG. 19c.

The camera setup may be calibrated in offline mode e.g. as follows. Camera parameters in terms of camera intrinsics and extrinsics may be obtained and stored. A number k of depth layers may be defined (block 804) and depth values $z_i$, $i \in [0 \div k]$ assigned. After the calibration has been performed, a low-powered sensing mode may be applied in the time-of-flight camera. This may be performed e.g. by decreasing camera resolution, by decreasing camera integration time until low-powered sensing mode is obtained, and/or by decreasing camera sensing power until low-powered sensing mode is obtained. Then, a camera setup may be started. In the setup synchronous triggering mechanism may be applied (block 806) and colour image and time-of-flight data maps for range $D_M$, phase angles $\varphi_M$, and amplitudes $A_M$ may be captured (block 808) and the captured data may be stored (block 810) to a memory.

After the camera setup has been performed, an embodiment may also comprise applying denoising filter (block 812) on time-of-flight data utilizing e.g. a non-local means paradigm. If the denoising filtering was performed, the filtered amplitude data map $A_M^U$, range data map $D_M^U$, and phase data map $\varphi_M^U$ may be stored to the memory to replace the previously obtained amplitude data map $A_M$, range data map $D_M$, and phase data map $\varphi_M$.

A depth map $Z_M$ may be calculated (block 814) from the range data map $D_M$.

The amplitude data map $A_M$, the range data map $D_M$, and the phase data map $\varphi_M$ may then be upsampled (block 816) to obtain upsampled amplitude data map $A_M'$, upsampled range data map $D_M'$, and upsampled phase data map $\varphi_M'$. The resolution of the upsampled data maps $A_M'$, $Z_M'$, $\varphi_M'$ may correspond with the resolution of the colour camera.

For each depth layer $z_i$ the following steps may be performed. A projective transform $H_i$ of the colour image RGB is estimated for the depth layer $z_i$, and the colour data is back-projected by the projective transform $H_i$, wherein the back-projected data RGB is resampled to obtain resampled colour image $RGB^i$ (block 820). Then, a cost map $C_i$ may be calculated (block 822) and filtered (block 824) to obtain a filtered cost map $C_i^U$. The filtering of the cost map $C_i$ may be performed by applying a cross-modality filter utilizing non-local means paradigm. Optionally, filter weights may be adapted by the amplitude data map $A_M{}'$ (block 826). Filtering results may be stored (block 828) to the memory as a filtered cost map $C_i{}^U$. The above steps may be repeated to a next layer i+1 until all layers have been processed (i.e. i>k) (block 818).

Now, the cost maps may be aggregated e.g. as follows. The depth map z(u,v) may be aggregated (block 830) for the best cost by finding the smallest cost value for each pixel of each layer by $MIN\{(C_i(u,v), i\epsilon[0\div k-1])\}$, wherein the smallest values form the aggregated depth map $Z_M{}^U$. Similarly, the colour image $RGB_{ToF}(u,v)$ may be aggregated (block 832) for the best cost by finding the smallest cost value for each pixel of each layer by $MIN\{(Ci(u,v), i\epsilon[0\div k-1])\}$, wherein the smallest values form the aggregated colour image $RGB_{ToF}{}^U$.

The output of the above described process are the aggregated depth map $Z_M{}^U$ (block 834) and the colour image $RGB_{ToF}{}^U$ (block 836), which may be stored to the memory.

Optionally, the depth map $Z_M$ may be updated by replacing the depth map with the aggregated depth map (i.e. $Z_M{}^U \rightarrow Z_M$) and the above steps may be iterated (block 838).

It may also be possible to use $RGB_{ToF}$ modality for the denoising filtering process described above.

In the following, some of the above mentioned stages are described in more detail in the following.

Defining Depth Layers

Several approaches could be utilized for optimal calculation of depth layers. For the sake of this approach two variants are described. In the first approach, the assignment of a particular depth layer is done according to its pixel shift (or disparity) that could result in a projection alignment process. The possible pixel shift range after projection to corresponding camera grids (RGB and time-of-flight) $ps^{RGB}{}_{(MIN, MAX)}$, $ps^{ToF}{}_{(MIN, MAX)}$ by operating range of active sensor device $z_{(MIN, MAX)}$ may be calculated as follows:

$$ps^{RGB}_{(MAX,MIN)} = \frac{B_{TOF-RGB} \cdot f_{RGB}}{z_{(MIN,MAX)}}, \quad ps^{ToF}_{(MAX,MIX)} = \frac{B_{TOF-RGB} \cdot f_{ToF}}{z_{(MIN,MAX)}} \quad (14)$$

where $B_{TOF-RGB}$ is the baseline between the colour and the active sensing device, $f_{RGB}$, $f_{ToF}$ are the focal lengths of the colour camera and the range device, respectively. The number of layers k of the scene depends on the minimum $ps_{MIN}$ and maximum $ps_{MAX}$ pixel shift values and a precision parameter P. For example, calculating and assigning depth layers in a real-case 3D camera setup may be done as follows:

Active sensor device:
sensing principle: Time of Flight
resolution: 200×200[pixels]
fToF: 94
operating range: $z_{(MIN, MAX)}$=0.5÷7 m
Camera setup baseline:
$B_{TOF-RGB}$: 0.06 m
Colour camera:
resolution: 1920×1080[pixels]
$f_{RGB}$: 581
Precision shift parameter
P: 1[pixels]
Calculating pixel shift range:
for colour camera grid: $ps^{RGB}{}_{(MAX,MIN)}$: [69.72, 4.64]
for ToF camera grid: $ps^{ToF}{}_{(MAX,MIN)}$: [11.2, 0.75]
Calculating number of layers for the colour camera grid:

$$k_{RGB} = \frac{\lfloor ps^{RGB}_{MAX} - ps^{RGB}_{MIN} \rfloor}{P} = 65 \quad (15)$$

Calculating layers for the colour camera grid:

$$z_i^{RGB} = \frac{B_{TOF-RGB} \cdot f_{RGB}}{(k_{RGB} - i)} \quad (16)$$

An alternative approach that does not depend on camera parameters may be done by calculating layers related only to the depth range:

$$z_i^{RGB,ToF} = \frac{1}{\left(\frac{i}{k}\left(\frac{1}{z_{MIN}} - \frac{1}{z_{MAX}}\right) + z_{MAX}\right)} \quad (17)$$

where k is arbitrary chosen number of desired layers. For example if k=100 for $z_{(MIX,MAX)}$=0.5, 7.5 m, the following depth layers may be generated and plotted.

Projection of Colour Data

For each defined depth layer $z_i$ colour data may be projected for resulted transform $H_i$ and resampled in a manner as described earlier in this specification. The resulted projection image maps $RGB^i$ are stored into memory to be processed further by a denoise filtering stage. As observed in FIG. 20, the scene objects in projected image that have depths closely to $z_i$ may have good alignment with cost maps of higher confidence (darker colours).

In the first row of FIG. 20, the first block illustrates a calculated cost map for a very far layer, the second block illustrates a calculated cost map for a middle layer, and the third block illustrates a calculated cost map for a front layer. Respectively, in the second row of FIG. 20, the first block illustrates a projected colour image for the very far layer, the second block illustrates a projected colour image for the middle layer, and the third block illustrates a projected colour image for the front layer.

Calculating Cost Maps

Cost map for each projection i–$C_i$ is calculated for every pixel position (u,v) by difference of corresponding original (noisy) depth value $Z_M(u,v)$ and the assigned depth value $z_i$ for the same projection. The resulted value is limited to a given threshold th, which, for example, may be calculated as the difference between assigned values of two consecutive projections (e.g. $z_i$ and $z_i$+1):

$$C_i(u,v) =_{MIN}\{(z_i - Z_M(u,v)), th\} \quad (18)$$

where $th = z_{i+1} - z_i$.

The resulted cost map is stored into memory to be processed further by the denoising filtering stage.

Denoising Cost Maps

Every cost map $C_i$ may be filtered separately by a denoising filter. The result is stored in a filtered cost map $C_i{}^U$. For the denoising filter, a cross-modality filter approach utilizing non-local paradigm may be chosen. The filter weights are adapted according to a noise confidence given by the amplitude map $A_M$ (Eq. 11), and colour texture patch similarity in projected colour map $RGB_M$:

$$C_i^U(u,v) = \frac{1}{W_N(u,v)} \left( \sum_{(s,r) \in \Omega_{u,v}} N(A_M(s,r)) \right) \quad (19)$$

$$\exp\left(-\frac{G \times (\|RGB_M^i(s+\cdot,r+\cdot) - RGB_M^i(u+\cdot,v+\cdot)\|)(0)}{2\sigma_F^2}\right) \cdot C_i(s,r),$$

$$N(A_M(s,r)) = \frac{A_M(s,r)}{MAX(A_M)},$$

$$W_N(u,v) = \sum_{s,r \in \Omega_{u,v}} \exp\left(-\frac{G \times (\|RGB_M^i(s+\cdot,r+\cdot) - RGB_M^i(u+\cdot,v+\cdot)\|)(0)}{2\sigma_F^2}\right)$$

where $\Omega(u,v)$ defines pixel search neighbourhood around coordinate $(u,v)$, $(s,r)$ is a centre coordinate in a similarity patch in $\Omega(u,v)$, $\times \cdot (0)$ is a centred convolution operator, $N(\cdot)$ is an amplitude normalizer operator, $W_N(u,v)$ is normalization factor, and $(+\cdot)$ are pixel indices of a spatial neighbourhood.

A depiction of several denoised cost maps applying Eq. 19 are given in FIG. 21. In FIG. 21 different pictures illustrate examples of filtered cost maps of different layers row-wisely from left to right and from top to bottom, i.e. the upper left picture illustrates a filtered cost map farthest from a depth camera; and the lower right picture illustrates a filtered cost map at a level closest to the depth camera. As an option, the filter could combine additional weights specific to time-of-flight data. For example, the amplitude map AM and the phase map φM (or the depth map DM, or an aggregated cost map CMIN) may be combined into complex maps.

Aggregating Cost Maps

The resulted upsampled and filtered depth map $Z_U$ may be obtained by applying for each pixel $(u,v)$ an aggregation process. For example, it can be the best cost among all filtered cost maps:

$$C_{MIN}(u,v) = MIN\{C_iU(u,v), i \in [0,k-1]\} \quad (20)$$

Then, the corresponding depth value z assigned for the best cost is stored for the pixel $(u,v)$. The same aggregation process can be utilized to obtain upsampled colour map $RGB_{ToF}^U$.

As an option, iterations may be implemented, where outputs can be utilized for enhancing result for a better confidence map evaluation, better preliminary denoising of raw data by resulted colour rendering of $RGB_{ToF}^U$.

In the following an example embodiment of a method to align, up-sample and de-noise a low-quality depth map using available higher resolution colour image when both camera sensors are calibrated will be described in more detail. The whole processing may be done in a probabilistic manner, taking benefits from two approaches, namely super-resolution filter and a plane-sweeping approach.

Visible scene (frustrum) in front of the colour camera is probabilistically separated by number of hypothesizes (e.g. planes of constant depth). For each depth hypothesis, pixels of a colour image are projected to a depth camera sensor; hence, for each particular pixel of a colour camera and the depth hypothesis number interpolated depth value may be obtained. Collected depth values may be converted to cost values and stored in a special memory buffer, which may be called as a 3D cost volume. Such cost volume may be aligned with the colour image and may have its full resolution. Number of slices of the cost volume corresponds to the number of depth hypothesizes, used in the previous step. Colour-weighted filtering may be applied on the cost volume in the per-slice manner (e.g. each slice of the cost volume is filtered independently) in order to remove uncorrelated errors from the signal as well as for estimating resulting depth in the occluded areas. Winner-takes-all method may be used to recover denoised and aligned depth map values from the filtered cost volume. Interpolation technique may be used to estimate depth values with sub-integer accuracy. Each pixel of a colour image may be filled with the most probable depth value.

In the method two calibrated frames may be used as an input. Those calibrated frames may be the depth map (D) and the colour image (I). Additionally, minimum ($z_{min}$) and maximum ($z_{max}$) depth of the scene and the desired number of layers (n) may also be obtained for the method. A map of the depth sensing confidence (A) can be additionally provided. This image may be used as an additional modality and participate in the bilinear weighting. For time-of-flight cameras, such confidence can be estimated from the amplitude image, also known as an infrared reflectance map. For other sensor types (for instance triangulation sensors) validity map may be available, describing areas where confident match was not found.

Since depth range will be quantized during the processing, the most optimal quantization method and depth representation may be selected for the application. For time of flight sensors, in which accuracy may not depend on the distance, linear range quantization and the direct depth may be optimal choices. For triangulation sensor, where accuracy of depth decreases with the distance, inverse quantization and correspondingly inverse depth representation (also known as generalized disparity map) may be used instead, as it may result in processing of linearly quantized pseudo-disparity range image. If some knowledge about the scene is available, more optimal range quantization may be applied. For instance, during video depth capturing, depth histogram of the previous frame may be used to estimate optimal range quantization values. This may have some importance when the number of layers is limited due to memory consumption or computational expenses. However, for non-linearly quantized range recovery of the depth with sub-integer accuracy might not be easy.

An example algorithm may comprise the following steps. For each i-th layer ($i \in [1, n]$) a pre-calculated $z_i$ value may be taken or a new $z_i$ value may be calculated (block 902 in FIG. 22). Assuming that all pixels of a colour image are located at the distance $z_i$ from the colour camera, they may be projected to a position of the depth camera (block 904).

Projected position may have non-integer coordinate, and hence corresponding depth value may be interpolated (block 906) in the regular-to-non-regular way. This may be done, for instance, with a bi-linear interpolation.

For pixels of the colour image an interpolated $z_d$ value and the projected $z_i$ value have been obtained. The interpolated $z_d$ value may have been interpolated e.g. from the depth camera. The projected $z_i$ value may not be a constant if cameras are not strictly parallel.

Cost value for the current pixel $(x,y)$ and hypothesis number i may be calculated (block 908) as $$C(x,y,i) = \min(|z_i - z_d|, \mu) \quad (21)$$

where $\mu$ is a thresholding parameter, regulating search area around each depth hypothesis. It should be selected in such way that the range $z_i \pm \mu$ will overlap neighbouring hypothezises. For non-linear range quantization, this parameter may vary for each layer.

A confidence map, if available, may be used (block 910) in several ways in order to avoid propagation of low-confident depth values, one of which is a modification of a cost volume formula:

$$C(x,y,i) = \min(|z_i - z_d|/(A_d + \alpha), \mu) \qquad (22)$$

where interpolated confidence value $A_d$ is used as a normalization factor for the resulting cost value. Low-confident values may be enlarged and then thresholded, and thus their effect on surrounding pixels may be significantly decreased. High-confident cost values may not be significantly changed. Small regularization parameter $\alpha$ may be used to avoid undefined inverse behaviour.

Examples of initial cost volume slices for different depth hypothezises are illustrated on the FIGS. 23*a*-23*d*. These slices are already roughly up-sampled and aligned to pixels of a reference colour image, however not de-noised yet. Each slice may contain information about a narrow portion on a scene.

Once a full cost-volume is constructed, it may be filtered (block 912) with a colour-weighted cross-filter, such as a cross-bilateral, cross-NLM, cross-BM3D or any other similar filter, where aggregation weights are calculated from the available colour image. Spatially invariant filter, such as a block-averaging or a Gaussian filter can also be used, instead of the colour-weighted filter. However, it may only be practical in cases when original depth already has high enough resolution and relatively low noise. E.g. such scheme with spatially invariant filtering may only be useful for depth alignment and avoidance of non-regular-to-regular resampling, while may not introduce any new details in the resulting depth (See results on FIG. 24*d*).

If available, the confidence map can also be used (block 914) as an additional weighting mechanism during colour-weighted filtering, instead of applying confidence weighting in the cost computation step.

Because colour and depth cameras are non-confocal, i.e. shifted from each other, occlusion artefacts usually appear during alignment of a depth map to the position of a colour camera. In these occluded areas aligned depth may have erroneous values, which may be difficult to compensate. Nevertheless, colour information in these areas may still be valid and correct. As the occlusions usually appear on the background surfaces of the scene, texture information in these areas may normally correspond to it of the neighbouring background areas. Hence, colour-weighted filtering such as bilateral or non-local-means still may recover depth values, when applied to a cost volume. In contrast, colour-weighted filtering applied directly to the aligned depth map, may not be able to recover correct depth, but instead may produce smooth transitions between correct and wrong depth values.

Winner-takes-all depth selection approach may be applied (block 916) on a filtered cost volume in order to obtain finally estimated depth map. For each pixel (x,y) of a cost volume, the slice containing the minimum value may be taken as a correct hypothesis and the corresponding depth value $z_i$ is a final depth estimate for this pixel in the colour image. If the range is quantized uniformly, the minimum cost value and two values around it may be used in order to apply interpolated depth value with sub-integer accuracy.

Figure 24A:
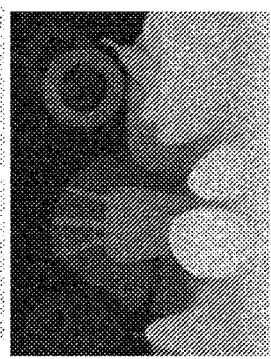
Figure 24B:
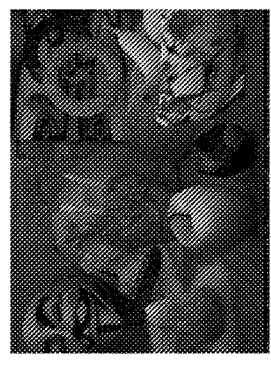
Figure 24C:
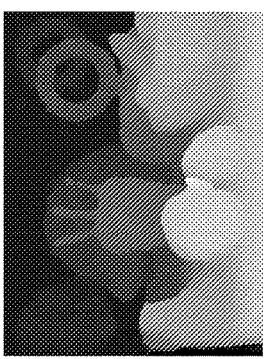
Figure 24D:
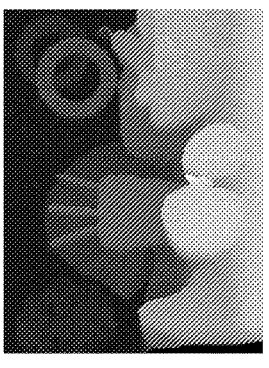
Figure 25B:
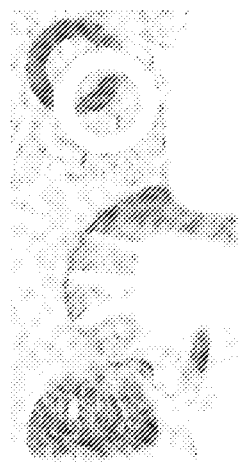
Figure 25D:
Figure 25A:
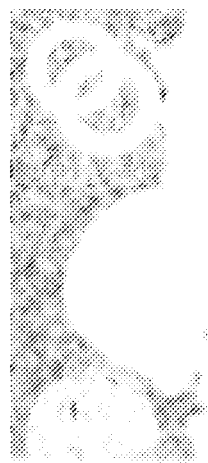
Figure 25C:
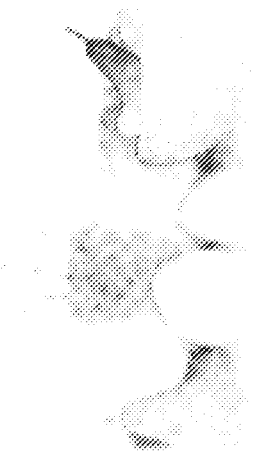

FIGS. 24*a*-24*d* illustrate the performance of the above described approach on the synthesized dataset. An example of an input image is depicted in FIG. 24*a*. Unaligned depth map was downsampled 4×4 times and corrupted with variable noise to emulate low-powered time-of-flight sensing environment (FIG. 24*b*). FIG. 24*c* illustrates de-noised, upsampled and aligned result obtained with the above described approach. FIG. 24*d* illustrates the same approach, but local averaging is used instead of cross-bilateral filtering. Even though the depth map in the latter case is somehow up-sampled and aligned to the given colour image, its discontinuities were distorted.

FIGS. 25*a*-25*d* illustrate some cost volume slices filtered with cross-bilateral filter for the same four depth hypothezises. They correspond to the same hypothezises as depicted in FIGS. 24*a*-24*d*. Due to the applied filtering, discontinuities in the cost slices are adjusted to their correct positions, thus resolution and details level of the resulting depth map are improved and boundaries in cost become sharper and contain more details.

The above described methods for obtaining depth maps may be utilized in many different applications. For example, a free-viewpoint image interpolation method with explicit dis-occlusion handling may benefit from the improved quality depth maps. Such free-viewpoint view interpolation between unrectified images makes possible many useful applications, such as free-viewpoint TV, 3D scene exploration, "Matrix" (fly-around) effect and many others.

In order to achieve free-viewpoint interpolation between unrectified images, some or all of the following steps may be performed. View rectification (assuming calibration parameters already known); Stereo-matching (finding best horizontal offset for each pixel of each image); Disparity map refinement (occlusions and uncertainties in the depth map may be presented); View synthesis with depth image-based rendering (DIBR) (2-steps reverse warping technique is usually applied); and Dis-occlusion hole filling in the synthesized view (even though during view interpolation such holes may be rare, they still should be processed).

View interpolation methods based on the plane-sweeping family of approaches may reduce complexity by avoiding redundant pre-computation of depth maps and hence may become suitable for real-time applications. Another source of acceleration in these methods is the absence of hole-filling steps, as holes are filled automatically with the most probable colour values, even though they may be not fully correct.

In an image-based view interpolation with plane-sweeping algorithm, a visible scene (frustrum) may be probabilistically separated by the number of hypothezises (usually planes of constant depth) for the desired camera view. Now, for each depth hypothesis, given images can be projected to a virtual camera sensor. In the practice, it may be made the other way around—each pixel of virtual image is projected to a given camera sensor(s), and the colour value is interpolated to the warped non-integer position. Hence, for each pixel of a virtual camera and the particular depth hypothesis one can estimate corresponding colours from all given cameras. Now, calculating a total variation between all given colour values or some other photo consistency metric, one may obtain a cost value for each pixel of the virtual image at each depth hypothesis. After having cost volume aggregated, depth hypothesis, which gives the minimum cost at the particular pixel may represent the most probable depth of this pixel, and hence the final colour of that pixel can be estimated from the corresponding projected colour values (for instance as a mean value or a truncated mean value). By this approach each pixel will be filled with at least some colour value.

FIG. 26 illustrates a generic view interpolation scheme with plane-sweeping approach. The left camera 260 and right camera 261 acquire images of a same scene 263 (cup in this example), but from different viewpoints. The scene is divided by planes 264 of constant depth, while viewed from central (virtual) camera 262. Image data 265, 266 from aside a (given) camera projected to these planes, and used as a source for further view synthesis 267. The virtual camera 262 is located between the left camera 260 and the right camera 261. Even though true depth map of the scene may not be available, input images still can be re-projected to a virtual camera sensor, if some hypothesis about the scene depth is available. Taking into account the number of non-intersecting hypothezises, one can re-project input images number of times in order to check their photometric consistency. Apparently, highest correspondence between re-projected images appears on the hypothesis, which is closest to the true depth of a scene.

Even though the dis-occlusion holes may appear hidden during interpolating with the plane-sweeping approach, some artefacts still may be visible at places where they actually should be. When the number of cameras is low, for instance with the stereo-camera, these artefacts may become especially visible, which may prevent excellent visual experience from the interpolated video.

Such dis-occlusion problem is illustrated on the FIG. 27. It is assumed that the given scene consist from just two layers with the depths $Z_0$ and $Z_1$. The left and the right input views and the desired view are illustrated in the top row.

Now, in order to calculate a cost volume associated with the virtual view, generic view interpolation method may project given views to a number of hypothesis. Let us assume that $Z_0$ and $Z_1$ are somewhere among these hypothesizes. While projected at the $Z_0$ hypothesis slice of the cost volume may look nearly as in the middle column of the second row of FIG. 27. Black areas mean nearly-zero values, and bright areas represent a large variation (and hence cost value) between textures of projected images. In the same way, the slice of the cost volume can be projected to a $Z_1$ hypothesis (the last row on the FIG. 27). Hashed areas at the edges represent missing pixels, where the cost values may be filled with the maximum cost value (e.g. some pre-defined threshold value, which is big enough to consider larger cost values meaningless).

FIG. 28 illustrates that at certain areas around the foreground object, winner-takes-all selection based on the cost volume may not be able to choose correctly the depth hypothesis, and hence resulting colours will be selected based on the local variations of the cost volume, which are not always correct.

In the following, an example embodiment of a method to interpolate (synthesize) a virtual camera view from the number of given unrectified images with correctly filled dis-occluded areas will be described in more detail. In the method an additional weighting technique is used capable to discriminate between visible (correct) and occluded (wrong) pixels of the input images and weight them according to this property. In order to enable such discrimination, the number of cost volumes is constructed, where each of them corresponds to a particular given camera view. Each slice of such cost volume may be calculated as a photometric difference between corresponding image and other images where all of them are re-projected to the desired virtual camera position using the particular hypothesis plane. As directly calculated cost volumes are usually noisy and erroneous, they should be filtered with colour-weighted cross-filtering technique, applied in the per-slice manner, e.g. each slice is filtered using colour weights, calculated from the corresponding re-projected colour image, as was described earlier in this specification. Such colour-weighted cost volume filtering may be capable to increase discrimination strength of corresponding cost volumes. Then, the final colour for each pixel may be determined using the hypothesis with the best (minimal) cost value. However, such minimizing may be done, not only between different depths hypothesizes, but also between different cost volumes. Such a weighting technique may allow estimating the final output colour value as a weighted average between colours taken from all the cameras, where dis-occluded pixels will be penalized and the correct colours will be amplified.

The method is not restricted to a particular colour-weighed filtering approach, and can use any cross-filtering technique such as bilateral, SUSAN, non-local-means, BM3D, or any of their simplified or accelerated version or any other similar colour-weighted image filter.

In the method two or more views (images) from calibrated cameras and the desired virtual camera position are given, scene depth boundaries ($Z_{max}$ and $Z_{min}$) are approximately known, and the number of hypothesizes is specified.

The scene in front of the desired virtual camera view is separated by the number of hypothezises (for instance planes of constant depth). The hypothezises are not limited to be constant or even to be planar; they might also be of other surface types, for instance semi-spheres of different radius, which may be useful when cameras have fish-eye lenses.

A first buffer corresponding to the output colour image is prepared, and a second buffer corresponding to the minimum found cost is prepared and filled with a maximum cost value. A third buffer corresponding to the resulting depth map or final hypothesis number may also be prepared.

After preparing the buffers, the following steps may be performed for each hypothesis. Given camera views are projected to the desired camera position. One slice of the cost volume is calculated based on total variation or other metrics using all the available colour values. In case when some given image is unavailable at some particular pixel value in the desired view, it can be omitted, replaced by nearest available colour or handled by "mirroring" or other applicable technique. Then, for each projected image, a raw cost volume slice is filtered with cross-bilateral (or other colour-weighted type of filter) which takes the projected images as a guidance image, and the resulting cost volume slice is saved. Also for each pixel of the virtual image all the buffers are updated, if the at least one of the current (filtered) cost values is less than the corresponding cost value in the second buffer. The updating may be performed e.g. as follows. A new colour value from the first buffer is calculated as $$NewColour = \frac{\sum_{i=1..N} Colour(i) \cdot \frac{1}{Cost(i)}}{\sum_{i=1..N} N \frac{1}{Cost(i)}} \quad (23)$$

where N is the number of given views, colour(i) is a vector of colour values of i-th projected image in the current pixel, and cost(i) is a cost value in the current pixel which was filtered with the i-th projected image.

Current minimum cost value from the second buffer is replaced with the found minimum cost, and the value in the third buffer is updated with the current depth hypothesis number or corresponding depth value.

Weighting with the inverse cost values allows colour averaging to become resistant to dis-occlusions and in the same time does not require any complicated processing to segment correct areas from dis-occluded ones. If no occlusions appear in some area, cost(i) between different volumes may approximately match, and hence the NewColour may be calculated almost as simply as by averaging. While if at some area one view is occluded and another is not, cost values at some specific hypothesis in the second one may likely be filtered out by the colour-weighted filtering, which may result in significant difference between resulting cost values. In this case averaging may mostly absorb correct colour(s) and may avoid the dis-occluded ones.

Even though in the real images cost values never can reach zero, in some cases, such as cartoons or other synthesized imagery, large areas of different views may correspond to each other, hence resulting in zero-valued cost. To avoid uncertainty errors in such rare cases, averaging formula can be redefined to accommodate small regularization parameter ($\mu$), which may avoid undetermined inverse behaviour.

$$NewColour = \frac{\sum_{i=1..N} Colour(i) \cdot \frac{1}{Cost(i) + \mu}}{\sum_{i=1..N} N \frac{1}{Cost(i) + \mu}} \qquad (24)$$

FIG. 29 illustrates an example on using projected left and right images to prepare a cost volume slice filtered with the projected left image and a cost volume slice filtered with the projected right image. Top row on a FIG. 29 shows a cost slice, estimated for a $Z_0$ hypothesis and the corresponding projected left and right images.

While filtering a raw cost volume with the projected left image, background area, which do not coincide with the object on the projected image will be filtered out due to colour weighted filtering. This area is illustrated as a gray area on the corresponding image of the second row in FIG. 29. This area corresponds to the pixels which are not dis-occluded, while high-values-cost parts, which are illustrated with bright colour in FIG. 29, correspond to the dis-occluded pixels. The same procedure may be performed with the right image.

FIG. 30 illustrates the same process but for $Z_1$ hypothesis. The aside dis-occlusions may also be partially filtered by the colour-weighted filter, which may help to discover their true depth values.

FIG. 31 illustrates an averaging performance, if calculated with the aforementioned formula. Black area corresponds to pixels, possibly taken from the left view and the bright area corresponds to pixels taken from the right view. Gray pixels are approximately estimated as a mean between left and right images. Even though in the illustrated scene there is no foreground areas on the sides (from left or from right), in the real scenes, where depth variations on the frame boundaries may be high, the above described algorithm may tend to propagate left-side pixels from the left image and right-side pixels from the right image, which corresponds to an optimal behaviour. This is also illustrated on the FIG. 31.

Even though the presented FIGS. 27-31 illustrate oversimplified scene, with just two layers, the complicated scenes may also be correctly handled by the above described method.

It should be noted that even if the background area was not a constant, but rather intersect number of hypothezises, resulting pixels would be selected from the most corresponding hypothezises, making possible to treat complicated background geometries.

As described above, FIGS. 18 and 22 are some example flowcharts of a method, apparatus and program product according to some example embodiments. It will be understood that each block of the flowcharts, and combinations of blocks in the flowcharts, may be implemented by various means, such as hardware, firmware, processor, circuitry and/or other device associated with execution of software including one or more computer program instructions.

For example, one or more of the procedures described above may be embodied by computer program instructions. In this regard, the computer program instructions which embody the procedures described above may be stored by a memory device 24 of an apparatus 20 employing an embodiment of the present invention and executed by a processor 22 in the apparatus. As will be appreciated, any such computer program instructions may be loaded onto a computer or other programmable apparatus (e.g., hardware) to produce a machine, such that the resulting computer or other programmable apparatus embody a mechanism for implementing the functions specified in the flowchart blocks.

These computer program instructions may also be stored in a non-transitory computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIGS. 18 and/or 22, when executed, convert a computer or processing circuitry into a particular machine configured to perform an example embodiment of the present invention.

Accordingly, the operations of FIGS. 18 and/or 22 define an algorithm for configuring a computer or processing circuitry (e.g., processor) to perform an example embodiment. In some cases, a general purpose computer may be configured to perform the functions shown in FIGS. 18 and/or 22 (e.g., via configuration of the processor), thereby transforming the general purpose computer into a particular machine configured to perform an example embodiment.

Accordingly, blocks of the flowcharts support combinations of means for performing the specified functions, combinations of operations for performing the specified functions and program instructions for performing the specified functions. It will also be understood that one or more blocks of the flowcharts, and combinations of blocks in the flowcharts, can be implemented by special purpose hardware-based computer systems which perform the specified functions or operations, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method comprising:
    obtaining a frame of an image of a scene;
    obtaining a frame of a depth map regarding the frame of the image;
    determining a minimum depth and a maximum depth of the scene;
    determining a number of depth layers for the depth map;
    with at least a processor, projecting pixels of the image to the depth layers to obtain respective projected pixels on the depth layers;
    determining cost values for the respective projected pixels;
    filtering the cost values;
    selecting a filtered cost value from a layer to obtain respective depth values of the pixels of an estimated depth map; and
    generating a depth-view image of the scene based on the respective depth values of the pixels.

2. The method according to claim 1 further comprising quantizing the respective depth values.

3. The method according to claim 1 further comprising interpolating the respective depth values.

4. The method according to claim 1 further comprising upsampling the respective depth values to correspond with a resolution of the image.

5. The method according to claim 1, wherein the determining the cost values comprises using confidence information of at least one of the depth values to replace a low confidence depth value with a predetermined value.

6. The method according to claim 1, wherein the filtering the cost values comprises using a colour-weighted filter.

7. The method according to claim 1, wherein the selecting comprises selecting a minimum cost value among cost values of different layers of a current pixel as the depth value for the current pixel.

8. An apparatus configured to:
    obtain a frame of an image of a scene;
    obtain a frame of a depth map regarding the frame of the image;
    determine a minimum depth and a maximum depth of the scene;
    determine a number of depth layers for the depth map;
    project pixels of the image to the depth layers to obtain respective projected pixels on the depth layers;
    determine cost values for the respective projected pixels;
    filter the cost values;
    select a filtered cost value from a layer to obtain respective depth values of the pixels of an estimated depth map; and
    generate a depth-view image of the scene based on the respective depth values of the pixels.

9. The apparatus according to claim 8, wherein the apparatus is further configured to quantize the respective depth values.

10. The apparatus according to claim 8, wherein the apparatus is further configured to interpolate the respective depth values.

11. The apparatus according to claim 8, wherein the apparatus is further configured to upsample the respective depth values to correspond with a resolution of the image.

12. The apparatus according to claim 8, wherein to determine the cost value, the apparatus is further configured to use confidence information of at least one of the depth values to replace a low confidence depth value with a predetermined value.

13. The apparatus according to claim 8, wherein to filter the cost vales, the apparatus is further configured to use a colour-weighted filter.

14. The apparatus according to claim 8, wherein to select the filtered cost value, the apparatus is further configured to select a minimum cost value among cost values of different layers of a current pixel as the depth value for the current pixel.

15. A computer program product comprising computer instructions residing in a non-transitory computer-readable medium, the instructions when executed by a processor cause an apparatus to:
    obtain a frame of an image of a scene;
    obtain a frame of a depth map regarding the frame of the image;
    determine a minimum depth and a maximum depth of the scene;
    determine a number of depth layers for the depth map;
    project pixels of the image to the depth layers to obtain respective projected pixels on the depth layers;
    determine cost values for the respective projected pixels;
    filter the cost values;
    select a filtered cost value from a layer to obtain respective depth values of the pixels of an estimated depth map; and
    generate a depth-view image of the scene based on the respective depth values of the pixels.

16. The computer program product according to claim 15, wherein the apparatus is further caused to quantize the respective depth values.

17. The computer program product according to claim 15, wherein the apparatus is further caused to interpolate the respective depth values.

18. The computer program product according to claim 15, wherein the apparatus is further caused to upsample the respective depth values to correspond with a resolution of the image.

19. The computer program product according to claim 15, wherein to determine the cost values, the apparatus is further caused to use confidence information of at least one of the depth value to replace a low confidence depth value with a predetermined value.

20. The computer program product according to 15, wherein to filter the cost values, the apparatus is further caused to use a colour-weighted filter.

21. The computer program product according to claim 15, wherein to select the filtered cost value, the apparatus is further caused to select a minimum cost value among cost values of different layers of a current pixel as the depth value for the current pixel.

* * * * *